United States Patent
Lys et al.

(10) Patent No.: US 6,717,376 B2
(45) Date of Patent: Apr. 6, 2004

(54) AUTOMOTIVE INFORMATION SYSTEMS

(75) Inventors: Ihor A. Lys, Boston, MA (US); Kevin Dowling, Westford, MA (US); Eric Schanberger, Cambridge, MA (US); Christian P. Blanc, Cambridge, MA (US)

(73) Assignee: Color Kinetics, Incorporated, Boston, MA (US)

( * ) Notice: Subject to any disclaimer, the term of this patent is extended or adjusted under 35 U.S.C. 154(b) by 0 days.

(21) Appl. No.: 09/989,095

(22) Filed: Nov. 20, 2001

(65) Prior Publication Data

US 2002/0158583 A1 Oct. 31, 2002

Related U.S. Application Data

(63) Continuation-in-part of application No. 09/669,121, filed on Sep. 25, 2000, which is a continuation of application No. 09/425,770, filed on Oct. 22, 1999, now Pat. No. 6,150,774, which is a continuation of application No. 08/920,156, filed on Aug. 26, 1997, now Pat. No. 6,016,038, application No. 09/989,095, which is a continuation-in-part of application No. 09/333,739, filed on Jun. 15, 1999, and a continuation-in-part of application No. 09/215,624, filed on Dec. 17, 1998, and a continuation-in-part of application No. 09/213,607, filed on Dec. 17, 1998, and a continuation-in-part of application No. 09/213,189, filed on Dec. 17, 1998, and a continuation-in-part of application No. 09/213,581, filed on Dec. 17, 1998, and a continuation-in-part of application No. 09/213,540, filed on Dec. 17, 1998, application No. 09/989,095, which is a continuation-in-part of application No. 09/742,017, filed on Dec. 20, 2000, which is a continuation of application No. 09/213,548, filed on Dec. 17, 1998, now Pat. No. 6,166,496, application No. 09/989,095, which is a continuation-in-part of application No. 09/815,418, filed on Mar. 22, 2001, which is a continuation of application No. 09/213,548, filed on Dec. 17, 1998, now Pat. No. 6,166,496, application No. 09/989,095, which is a continuation-in-part of application No. 09/626,905, filed on Jul. 27, 2000, now Pat. No. 6,340,868, which is a continuation of application No. 09/213,659, filed on Dec. 17, 1998, now Pat. No. 6,211,626.

(60) Provisional application No. 60/252,004, filed on Nov. 20, 2000, provisional application No. 60/262,022, filed on Jan. 16, 2001, provisional application No. 60/268,259, filed on Feb. 13, 2001, provisional application No. 60/262,153, filed on Jan. 17, 2001, provisional application No. 60/296,219, filed on Jun. 6, 2001, provisional application No. 60/071,281, filed on Dec. 17, 1997, provisional application No. 60/068,792, filed on Dec. 14, 1997, provisional application No. 60/078,861, filed on Mar. 20, 1998, provisional application No. 60/079,285, filed on Mar. 25, 1998, and provisional application No. 60/090,920, filed on Jun. 26, 1998.

(51) Int. Cl.[7] .............................................. G05F 1/00

(52) U.S. Cl. ...................... 315/292; 315/297; 315/362; 315/79; 315/80; 340/815.45; 340/815.65; 362/372; 362/489

(58) Field of Search ............................. 315/77, 79, 80, 315/82, 292, 291, 297, 307, 360, 362; 340/453, 458, 466, 479, 471, 525, 815.45, 815.47, 815.5, 815.65, 989, 990; 362/372, 471, 489, 800, 806, 482

(56) References Cited

U.S. PATENT DOCUMENTS 2,909,097 A  10/1959  Alden et al.

(List continued on next page.)

FOREIGN PATENT DOCUMENTS

AU   6 267 9   12/1996

(List continued on next page.)

OTHER PUBLICATIONS

* "LM117/LM317A/LM317 3–Terminal Adjustable Regulator", National Semiconductor Corporation, May 1997, pp. 1–20.

(List continued on next page.)

Primary Examiner—Haissa Philogene
(74) Attorney, Agent, or Firm—Lowrie, Lando & Anastasi, LLP

(57) ABSTRACT

An embodiment of this invention relates to an intelligent lighting device that can receive signals and change the illumination conditions as a result of the received signals. The lighting device can change hue, saturation, and brightness as a response to received signals. One example of using such a lighting device is to display particular colors as a response to certain events. Among others, embodiments may include vehicle lighting systems, an information cube, a back lighting system for a display panel, and an indicator of a condition of a package.

88 Claims, 17 Drawing Sheets

U.S. PATENT DOCUMENTS

| | | | |
|---|---|---|---|
| 3,318,185 A | 5/1967 | Kott | |
| 3,561,719 A | 2/1971 | Grindle | |
| 3,586,936 A | 6/1971 | McLeroy | |
| 3,601,621 A | 8/1971 | Ritchie | |
| 3,643,088 A | 2/1972 | Osteen et al. | |
| 3,746,918 A | 7/1973 | Drucker et al. | |
| 3,818,216 A | 6/1974 | Larraburu | |
| 3,832,503 A | 8/1974 | Crane | |
| 3,858,086 A | 12/1974 | Anderson et al. | |
| 3,909,670 A | 9/1975 | Wakamatsu et al. | |
| 3,924,120 A | 12/1975 | Cox, III | |
| 3,958,885 A | 5/1976 | Stockinger et al. | |
| 3,974,637 A | 8/1976 | Bergey et al. | |
| 4,001,571 A | 1/1977 | Martin | |
| 4,054,814 A | 10/1977 | Fegley et al. | |
| 4,070,568 A | 1/1978 | Gala | |
| 4,082,395 A | 4/1978 | Donato et al. | |
| 4,096,349 A | 6/1978 | Donato | |
| 4,101,870 A * | 7/1978 | Ekman | 340/459 |
| 4,241,295 A | 12/1980 | Williams, Jr. | |
| 4,271,408 A | 6/1981 | Teshima et al. | |
| 4,272,689 A | 6/1981 | Crosby et al. | |
| 4,273,999 A | 6/1981 | Pierpoint | |
| 4,298,869 A | 11/1981 | Okuno | |
| 4,329,625 A | 5/1982 | Nishizawa et al. | |
| 4,367,464 A | 1/1983 | Kurahashi et al. | |
| 4,388,567 A | 6/1983 | Yamazaki et al. | |
| 4,388,589 A | 6/1983 | Molldrem, Jr. | |
| 4,392,187 A | 7/1983 | Bornhorst | |
| 4,420,711 A | 12/1983 | Takahashi et al. | |
| 4,435,732 A * | 3/1984 | Hyatt | 348/748 |
| 4,500,796 A | 2/1985 | Quin | |
| 4,597,033 A | 6/1986 | Meggs et al. | |
| 4,622,881 A | 11/1986 | Rand | |
| 4,625,152 A | 11/1986 | Nakai | |
| 4,635,052 A | 1/1987 | Aoike et al. | |
| 4,647,217 A | 3/1987 | Havel | |
| 4,656,398 A | 4/1987 | Michael et al. | |
| 4,668,895 A | 5/1987 | Schneiter | |
| 4,682,079 A | 7/1987 | Sanders et al. | |
| 4,686,425 A | 8/1987 | Havel | |
| 4,687,340 A | 8/1987 | Havel | |
| 4,688,154 A | 8/1987 | Nilssen | |
| 4,688,869 A | 8/1987 | Kelly | |
| 4,695,769 A | 9/1987 | Schweickardt | |
| 4,701,669 A | 10/1987 | Head et al. | |
| 4,705,406 A | 11/1987 | Havel | |
| 4,707,141 A | 11/1987 | Havel | |
| 4,727,289 A | 2/1988 | Uchida | |
| 4,740,882 A | 4/1988 | Miller | |
| 4,753,148 A | 6/1988 | Johnson | |
| 4,771,274 A | 9/1988 | Havel | |
| 4,780,621 A | 10/1988 | Bartleucci et al. | |
| 4,794,383 A | 12/1988 | Havel | |
| 4,806,782 A * | 2/1989 | Bernal | 307/10.1 |
| 4,818,072 A | 4/1989 | Mohebban | |
| 4,824,269 A | 4/1989 | Havel | |
| 4,837,565 A | 6/1989 | White | |
| 4,843,627 A | 6/1989 | Stebbins | |
| 4,845,481 A | 7/1989 | Havel | |
| 4,845,745 A | 7/1989 | Havel | |
| 4,857,801 A | 8/1989 | Farrell | |
| 4,863,223 A | 9/1989 | Weissenbach et al. | |
| 4,874,320 A | 10/1989 | Freed et al. | |
| 4,887,074 A | 12/1989 | Simon et al. | |
| 4,922,154 A | 5/1990 | Cacoub | |
| 4,934,852 A | 6/1990 | Havel | |
| 4,962,687 A | 10/1990 | Belliveau et al. | |
| 4,965,561 A | 10/1990 | Havel | |
| 4,973,835 A | 11/1990 | Kurosu et al. | |
| 4,979,081 A | 12/1990 | Leach et al. | |
| 4,980,806 A | 12/1990 | Taylor et al. | |
| 4,992,704 A | 2/1991 | Stinson | |
| 5,003,227 A | 3/1991 | Nilssen | |
| 5,008,595 A | 4/1991 | Kazar | |
| 5,008,788 A | 4/1991 | Palinkas | |
| 5,010,459 A | 4/1991 | Taylor et al. | |
| 5,027,262 A | 6/1991 | Freed | |
| 5,034,807 A | 7/1991 | Von Kohorn | |
| 5,036,248 A | 7/1991 | McEwan et al. | |
| 5,038,255 A | 8/1991 | Nishihashi et al. | |
| 5,072,216 A | 12/1991 | Grange | |
| 5,078,039 A | 1/1992 | Tulk et al. | |
| 5,083,063 A | 1/1992 | Brooks | |
| 5,122,733 A | 6/1992 | Havel | |
| 5,126,634 A | 6/1992 | Johnson | |
| 5,128,595 A | 7/1992 | Hara | |
| 5,130,909 A | 7/1992 | Gross | |
| 5,134,387 A | 7/1992 | Smith et al. | |
| 5,142,199 A | 8/1992 | Elwell | |
| 5,154,641 A | 10/1992 | McLaughlin | |
| 5,164,715 A | 11/1992 | Kashiwabara et al. | |
| 5,184,114 A | 2/1993 | Brown | |
| 5,194,854 A | 3/1993 | Havel | |
| 5,209,560 A | 5/1993 | Taylor et al. | |
| 5,225,765 A | 7/1993 | Callahan et al. | |
| 5,226,723 A | 7/1993 | Chen | |
| 5,254,910 A | 10/1993 | Yang | |
| 5,256,948 A | 10/1993 | Boldin et al. | |
| 5,278,542 A | 1/1994 | Smith et al. | |
| 5,282,121 A | 1/1994 | Bornhorst et al. | |
| 5,283,517 A | 2/1994 | Havel | |
| 5,294,865 A | 3/1994 | Haraden | |
| 5,298,871 A | 3/1994 | Shimohara | |
| 5,307,295 A | 4/1994 | Taylor et al. | |
| 5,329,431 A | 7/1994 | Taylor et al. | |
| 5,350,977 A | 9/1994 | Hamamoto et al. | |
| 5,357,170 A | 10/1994 | Luchaco et al. | |
| 5,366,376 A * | 11/1994 | Copperman et al. | 434/69 |
| 5,371,618 A | 12/1994 | Tai et al. | |
| 5,374,876 A | 12/1994 | Horibata et al. | |
| 5,375,043 A | 12/1994 | Tokunaga | |
| 5,381,074 A | 1/1995 | Rudzewicz et al. | |
| 5,388,357 A | 2/1995 | Malita | |
| 5,402,702 A | 4/1995 | Hata | |
| 5,404,282 A | 4/1995 | Klinke et al. | |
| 5,406,176 A | 4/1995 | Sugden | |
| 5,410,328 A | 4/1995 | Yoksza et al. | |
| 5,412,284 A | 5/1995 | Moore et al. | |
| 5,412,552 A | 5/1995 | Fernandes | |
| 5,420,482 A | 5/1995 | Phares | |
| 5,421,059 A | 6/1995 | Leffers, Jr. | |
| 5,432,408 A | 7/1995 | Matsuda et al. | |
| 5,436,535 A | 7/1995 | Yang | |
| 5,436,853 A | 7/1995 | Shimohara | |
| 5,450,301 A | 9/1995 | Waltz et al. | |
| 5,461,188 A | 10/1995 | Drago et al. | |
| 5,463,280 A | 10/1995 | Johnson | |
| 5,465,144 A | 11/1995 | Parker et al. | |
| 5,475,300 A | 12/1995 | Havel | |
| 5,489,827 A | 2/1996 | Xia | |
| 5,491,402 A | 2/1996 | Small | |
| 5,493,183 A | 2/1996 | Kimball | |
| 5,504,395 A | 4/1996 | Johnson et al. | |
| 5,515,285 A * | 5/1996 | Garrett et al. | 701/300 |
| 5,519,496 A | 5/1996 | Borgert et al. | |
| 5,545,950 A | 8/1996 | Cho | |
| 5,559,681 A | 9/1996 | Duarte | |
| 5,561,346 A | 10/1996 | Byrne | |
| 5,575,459 A | 11/1996 | Anderson | |
| 5,575,554 A | 11/1996 | Guritz | |

| | | |
|---|---|---|
| 5,585,783 A * | 12/1996 | Hall .......................... 340/473 |
| 5,592,051 A | 1/1997 | Korkala |
| 5,614,788 A | 3/1997 | Mullins et al. |
| 5,621,282 A | 4/1997 | Haskell |
| 5,634,711 A | 6/1997 | Kennedy et al. |
| 5,640,061 A | 6/1997 | Bornhorst et al. |
| 5,642,129 A | 6/1997 | Zavracky et al. |
| 5,656,935 A | 8/1997 | Havel |
| 5,673,059 A | 9/1997 | Zavracky et al. |
| 5,701,058 A | 12/1997 | Roth |
| 5,712,650 A | 1/1998 | Barlow |
| 5,721,471 A | 2/1998 | Begemann et al. |
| 5,734,590 A | 3/1998 | Tebbe |
| 5,751,118 A | 5/1998 | Mortimer |
| 5,752,766 A | 5/1998 | Bailey et al. |
| 5,769,527 A | 6/1998 | Taylor et al. |
| 5,803,579 A | 9/1998 | Turnbull et al. |
| 5,808,689 A | 9/1998 | Small |
| 5,821,695 A | 10/1998 | Vilanilam et al. |
| 5,836,676 A | 11/1998 | Ando et al. |
| 5,848,837 A | 12/1998 | Gustafson |
| 5,850,126 A | 12/1998 | Kanbar |
| 5,850,177 A * | 12/1998 | Zimmerman ................ 340/479 |
| 5,851,063 A | 12/1998 | Doughty et al. |
| 5,852,658 A | 12/1998 | Knight et al. |
| RE36,030 E | 1/1999 | Nadeau |
| 5,859,508 A | 1/1999 | Ge et al. |
| 5,896,010 A | 4/1999 | Mikolajczak et al. |
| 5,912,653 A | 6/1999 | Fitch |
| 5,921,652 A | 7/1999 | Parker et al. |
| 5,924,784 A | 7/1999 | Chliwnyj et al. |
| 5,927,845 A | 7/1999 | Gustafson et al. |
| 5,946,209 A | 8/1999 | Eckel et al. |
| 5,952,680 A | 9/1999 | Strite |
| 5,959,547 A | 9/1999 | Tubel et al. |
| 5,963,185 A | 10/1999 | Havel |
| 5,974,553 A | 10/1999 | Gandar |
| 5,975,728 A | 11/1999 | Weyer |
| 5,980,064 A | 11/1999 | Metroyanis |
| 6,008,783 A | 12/1999 | Kitagawa et al. |
| 6,016,038 A | 1/2000 | Mueller et al. |
| 6,018,237 A | 1/2000 | Havel |
| 6,025,550 A | 2/2000 | Kato |
| 6,031,343 A | 2/2000 | Recknagel et al. |
| 6,068,383 A | 5/2000 | Robertson et al. |
| 6,069,597 A | 5/2000 | Hansen |
| 6,072,280 A | 6/2000 | Allen |
| 6,092,915 A * | 7/2000 | Rensch ....................... 362/471 |
| 6,095,661 A | 8/2000 | Lebens et al. |
| 6,097,352 A | 8/2000 | Zavracky et al. |
| 6,132,072 A | 10/2000 | Turnbull et al. |
| 6,135,604 A | 10/2000 | Lin |
| 6,150,774 A | 11/2000 | Mueller et al. |
| 6,166,496 A | 12/2000 | Lys et al. |
| 6,181,126 B1 | 1/2001 | Havel |
| 6,183,086 B1 | 2/2001 | Neubert |
| 6,184,628 B1 | 2/2001 | Ruthenberg |
| 6,196,471 B1 | 3/2001 | Ruthenberg |
| 6,211,626 B1 | 4/2001 | Lys et al. |
| 6,215,409 B1 | 4/2001 | Blach |
| 6,250,774 B1 | 6/2001 | Begemann et al. |
| 6,273,338 B1 | 8/2001 | White |
| 6,292,901 B1 | 9/2001 | Lys et al. |
| 6,310,590 B1 | 10/2001 | Havel |
| 6,321,177 B1 | 11/2001 | Ferrero et al. |
| 6,323,832 B1 | 11/2001 | Nishizawa et al. |
| 6,330,314 B1 | 12/2001 | Motooka |
| 6,340,868 B1 | 1/2002 | Lys et al. |
| 6,459,919 B1 | 10/2002 | Lys et al. |
| 2001/0006380 A1 | 7/2001 | Jeong |
| 2001/0033488 A1 | 10/2001 | Chliwnyj et al. |
| 2002/0047624 A1 | 4/2002 | Stam et al. |

FOREIGN PATENT DOCUMENTS

| | | |
|---|---|---|
| CA | 2 178 432 | 12/1996 |
| DE | 3438 154 A1 | 4/1986 |
| DE | 39 16875 A1 | 12/1990 |
| DE | 40 41 338 A1 | 7/1992 |
| DE | 196 02 891 A1 | 7/1997 |
| EP | 0495305 A2 | 7/1992 |
| EP | 0534710 B1 | 1/1996 |
| EP | 0752632 A2 | 1/1997 |
| EP | 0752632 A3 | 8/1997 |
| EP | 0823812 A2 | 2/1998 |
| EP | 0935234 A1 | 8/1999 |
| EP | 0942631 A2 | 9/1999 |
| EP | 1020352 A2 | 7/2000 |
| EP | 1113215 A2 | 7/2001 |
| FR | 2 640 791 | 6/1990 |
| FR | 88 17359 | 12/1998 |
| GB | 2045098 A | 10/1980 |
| GB | 2135536 A | 8/1984 |
| GB | 2176042 A | 12/1986 |
| JP | 03045166 | 2/1991 |
| JP | 06043830 | 2/1994 |
| JP | 7-39120 | 7/1995 |
| JP | 8-106264 | 4/1996 |
| JP | 9 320766 | 12/1997 |
| WO | WO 89/05086 | 6/1989 |
| WO | WO 94/18809 | 8/1994 |
| WO | WO 95/13498 | 5/1995 |
| WO | WO 96/41098 | 12/1996 |
| WO | WO 01/53133 A1 | 7/2001 |
| WO | WO 02/061328 A1 | 8/2002 |

OTHER PUBLICATIONS

* "DS96177 RS–485/RS–422 Differential Bus Repeater", National Semiconductor Corporation, Feb. 1996, pp. 1–8.
* "DS2003/DA9667/DS2004 High Current/Voltage Darlington Drivers", National Semiconductor Corporation, Dec. 1995, pp. 1–8.
* "LM140A/LM140/LM340A/LM7800C Series 3—Terminal Positive Regulators", National Semiconductor Corporation, Jan. 1995, pp. 1–14.
* High End Systems, Inc., Trackspot User Manual, Aug. 1997, Excerpts (Cover, Title page, pp. ii through iii and 2–13 through 2–14).
* Artistic License, AL4000 DMX512 Processors, Revision 3.4, Jun. 2000, Excerpts (Cover, pp. 7,92 through 102).
* Artistic License, Miscellaneous Drawings (3 sheets) Jan. 12, 1995.
* Artistic License, Miscellaneous Documents (2 sheets Feb. 1995 and Apr. 1996).
* Newnes's Dictionary of Electronics, Fourth Edition, S.W. Amos, et al., Preface to First Edition, pp. 278–279.
*"http://www.luminus.cx/projects/chaser", (Nov. 13, 2000), pp. 1–16.
Co–pending U.S. patent application, Ser. No. 09/989,747, filed Nov. 20, 2001, Ihor A. Lys, et al., "Packaged Information Systems".
Co–pending U.S. patent application, Ser. No. 09/989,677, filed Nov. 20, 2001, Kevin Dowling et al., "Information Systems".

* cited by examiner

AUTOMOTIVE INFORMATION SYSTEMS

CROSS REFERENCES TO RELATED APPLICATIONS

This application claims the benefit under 35 U.S.C. §119 (e) of the following United States provisional patent applications:

United States Provisional Patent Application entitled "Intelligent Indicators," application Serial No. 60/252,004 filed Nov. 20, 2000;

United States Provisional Patent Application entitled "LCD Color Changing Screen," application Serial No. 60/262,022, filed Jan. 16, 2001;

United States Provisional Patent Application entitled "LED Based Lighting Systems and Methods for Vehicles" application Serial No. 60/268,259 filed Feb. 13, 2001;

United States Provisional Patent Application entitled "Information Systems" application Serial No. 60/262,153 filed Jan. 17, 2001; and United States Provisional Patent Application entitled "Systems and Methods for Displaying Information" application Serial No. 60/296,219 filed Jun. 6, 2001.

This application also claims the benefit under 35 U.S.C. §120 as a continuation-in-part (CIP) of co-pending U.S. Non-provisional application Ser. No. 09/669,121, filed Sep. 25, 2000, entitled "Multicolored LED Lighting Method and Apparatus", which is a continuation of U.S. Ser. No. 09/425,770, filed Oct. 22, 1999, now U.S. Pat. No. 6,150,774, which is a continuation of U.S. Ser. No. 08/920,156, filed Aug. 26, 1997, now U.S. Pat. No. 6,016,038.

This application also claims the benefit under 35 U.S.C. §120 as a continuation-in-part (CIP) of the following co-pending U.S. Non-provisional applications:

Ser. No. 09/215,624, filed Dec. 17, 1998, entitled "Smart Light Bulb";

Ser. No. 09/213,607, filed Dec. 17, 1998, entitled "Systems and Methods for Sensor-Responsive Illumination";

Ser. No. 09/213,189, filed Dec. 17, 1998, entitled "Precision Illumination";

Ser. No. 09/213,581, filed Dec. 17, 1998, entitled "Kinetic Illumination";

Ser. No. 09/213,540, filed Dec. 17, 1998, entitled "Data Delivery Track";

Ser. No. 09/333,739, filed Jun. 15, 1999, entitled "Diffuse Illumination Systems and Methods";

Ser. No. 09/742,017, filed Dec. 20, 2000, entitled "Lighting Entertainment System", which is a continuation of U.S. Ser. No. 09/213,548, filed Dec. 17, 1998, now U.S. Pat. No. 6,166,496;

Ser. No. 09/815,418, filed Mar. 22, 2001, entitled "Lighting Entertainment System", which also is a continuation of U.S. Ser. No. 09/213,548, filed Dec. 17, 1998, now U.S. Pat. No. 6,166,496; and Ser. No. 09/626,905, filed Jul. 27, 2000, entitled "Lighting Components", which is a continuation of U.S. Ser. No. 09/213,659, filed Dec. 17, 1998, now U.S. Pat. No. 6,211,626.

This application also claims the benefit under 35 U.S.C. §120 of each of the following U.S. Provisional Applications, as at least one of the above-identified co-pending U.S. Non-provisional Applications similarly is entitled to the benefit of at least one of the following Provisional Applications:

Serial No. 60/071,281, filed Dec. 17, 1997, entitled "Digitally Controlled Light Emitting Diodes Systems and Methods";

Serial No. 60/068,792, filed Dec. 24, 1997, entitled "Multi-Color Intelligent Lighting";

Serial No. 60/078,861, filed Mar. 20, 1998, entitled "Digital Lighting Systems";

Serial No. 60/079,285, filed Mar. 25, 1998, entitled "System and Method for Controlled Illumination"; and Serial No. 60/090,920, filed Jun. 26, 1998, entitled "Methods for Software Driven Generation of Multiple Simultaneous High Speed Pulse Width Modulated Signals".

All patents, patent applications, papers, publications, and other documents referenced herein are hereby incorporated by reference.

BACKGROUND

1. Field of the Invention

The invention relates to light emitting diode devices. In particular this invention relates to lighting devices that are configured to provide information.

2. Description of Related Art

Transmitting and receiving signals virtually instantaneously throughout the world has become a common event. Many devices are available for receiving and possibly re-transmitting signals received from computer networks and other networks. The user interface for reviewing these signals can take many forms including, but not limited to, phones, computers, laptop computers, handheld devices, and stand-alone devices. The development of intelligent light sources, as described in U.S. Pat. No. 6,016,038, has also transformed lighting and lighting control in recent years.

Information abounds through access to the World Wide Web and this information can be received and displayed in many ways on many devices. A computer is one of the primary portals for receiving, viewing and interacting with much of this information. Hand held devices are also becoming increasingly popular for receiving, viewing and interacting with information. The type of information displayed on these devices is also virtually endless. Information such as, but not limited to, financial, weather, sales data can all be downloaded and displayed. The download devices generally allow the user to interact with the data and perform transactions. Gaming software is also becoming a popular on-line activity where a person can interact with the gaming software from a remote location. Gaming is also very quickly becoming an online experience. Extensions of these games allow two or more users to participate in the same game at the same time even when all of the users are at different locations.

The Massachusetts Institute of Technology has a program in the media arts and sciences named Tangible Media directed by Hiroshi Ishii that has developed an interface called mediaBlocks that is described in *mediaBlocks: Tangible Interfaces for Online Media,* Brygg Ullmer and Hiroshi Ishii, MIT Media Lab, Published I the Conference Abstracts of CHI99, May 15–20, 1999, which is incorporated by reference herein. The Tangible Media group has the objective to develop human interfaces using physical objects. The physical objects are used to interface with digital media to make the interface easier to use and to create a less complex interface between man and machine. MediaBlocks is a tangible interface for physically capturing, transporting, and retrieving online digital media. For example, a mediablock may be placed in a slot next to a white board and the information contained on the white board would be digitally transferred to the mediaBlock. The mediaBlock could then be placed in a slot near a printer and the printer would then print the information from the white board. This eliminates the complex computer interfaces that are used today. This project is dedicated to reduce the complexity of the computer interface that has become commonplace is today's work and play environments.

Another paper from the Tangible Media Group, *ambeientROOM: Integrating Ambient Media with Architectural Space,* Hiroshi Ishii et. al., Tangible Media Group, MIT Media Laboratory, Published in the Conference Summary of CHI98, Apr. 18–23, 1998, discussed the possibilities of ambient controls within an office to increase the awareness of the office worker. In this paper, the authors discuss the sophisticated capabilities of humans' ability to process multiple information streams. Humans have an immense capacity for receiving and interpreting information that is occurring in the background of the activities in which we engage. To take advantage of this capacity, the authors created ambient conditions in an office that corresponded to information being received. For example, the office was equipped with a sound system to provide subtle background sounds such as the sound of a tropical forest. The volume and density of the activity in the forest sound stream would correspond to the amount of email or the value of the users stock portfolio. The office was also provided with a lighting pattern on a wall that changed when activity in the next room increased.

Accordingly it would be useful to provide a peripheral or addition to a standard device to display information in a way in which the user would be alerted to the information without having to interact with the interface. It would also be useful to provide an indicator for displaying information that would be both decorative and informative.

One area where there is a need for information is in connection with vehicles. Information generated by today's vehicles has increased tremendously over the typical car of the past. The instrument panel in today's automobiles and other personal vehicles may resemble an airplane cockpit because of the increased demand for information. This is partially based on the increase in demand for more information and partially because the design is appealing. Control systems in these vehicles are also becoming increasingly complex. To accommodate the increase in complexity, automakers continue to improve the ergonomic system surrounding the driver and passengers. Safety is also paramount and the improved ergonomic system is also designed to reduce driver fatigue and increase his overall awareness to his surroundings.

U.S. Pat. No. 5,803,579 teaches of a white-light lighting device for an automobile. This lighting device uses a combination of two LEDs to produce white light to take advantage of the lightweight, energy efficient, reduced heat, and reliability of LEDs as compared to incandescent systems. This system is designed to replace incandescent lighting systems by producing white light for the interior of the vehicle or the rear view mirror assembly.

It would be useful to provide a lighting system for vehicles that increased the appeal and design of the vehicle. It would also be useful to provide a lighting system that could convey information regarding the vehicles performance as well as other information.

Data abounds in today's connected world and converting all of the data into usable information remains a challenge. The Internet provides a portal to a vast variety of such information including financial, weather, sports and many other types of information. There are also software programs that generate information such as games, simulators, financial analysis programs and many other software driven applications. During the past several years, technology has provided us with more and more information every year and more and more devices to retrieve the information. We are now a connected world with the ability to receive and retrieve information from many sources including stationary devices such as the desktop computer, gaming platforms, Internet appliances and other stationary devices. We can also retrieve information through mobile devices such as a mobile phone, personal digital assistants, pagers, gaming devices and other mobile devices. Many such devices require user interactions to retrieve and observe useful information. It can be a challenge for any user of these systems to keep up with all of the relevant information provided. It would be useful to provide an information system to simplify or enhance the receipt of information.

Another area where lighting information systems may be needed is in connection with liquid crystal displays. A liquid crystal display (LCD) is an electro-optical device used to display digits, characters or images, commonly used in digital watches, calculators, cellular phones, portable devices and portable computers.

The liquid crystal display contains a liquid crystal material placed between a pair of transparent electrodes. The liquid crystal changes the phase of the light passing through it and this phase change can be controlled by a voltage applied between the electrodes. Liquid crystal displays can be formed by integrating a number of liquid crystal patterns in a display or by using a single liquid crystal plate and a pattern of electrodes.

One type of liquid crystal display, those used in digital watches and calculators, contain a common electrode plane covering one side and a pattern of electrodes on the other with a liquid crystal plane between the electrodes. These electrodes can be individually controlled to produce the appropriate display. Computer displays, however, require far too many pixels (typically between 50,000 and several millions) to make this scheme, in particular its wiring, feasible. The electrodes are therefore replaced by a number of row electrodes on one side and column electrodes on the other side. By applying voltage to one row and several columns the pixels at the intersections are set. This generates the requisite potential to activate the liquid crystal at the intersection of the two electrodes. This method creates pixels that can be activated to generate the characters or images.

There are generally two types of LCD displays: passive and active matrix. In a passive matrix display, the pixel fading is controlled through the persistence of the display. Putting an active element, such as a transistor, on the top of each pixel, can slow the fading. This "remembers" the setting of that pixel and is generally referred to as an active matrix display.

Color-image LCD screens are also available, although more expensive than the monochrome versions, and typically used in computer screens or other devices where it is desirable to display colored graphics. The colored screens are more expensive because of the increased complexity of the system. The colored LCD screens operate by generating pixels of red, green and blue light. These colored pixels are close enough, with respect to the user, that when energized they form colored pixels. These systems may produce a particular color through the liquid crystal or they may have a filter over the pixel to adjust the color. One particular method of generating a colored LCD screen is to provide a backlight that generates red, green and blue emission in three time segments. The liquid crystal provided in the screen has a transmittance of approximately 4% and will allow red, green and blue to pass. A very bright light source is therefore required to generate enough light that 4% transmission is acceptable for the screen brightness. Generally, the timing of the light sources is such that the three colors are on for predetermined segments of time. For example, the red may be on for the first one third of the time segment, the blue may be on for the second one third of the time segment, and the green may be on for the third one third of the time segment. Then the pixel is energized at the same time as the particular color is energized. The liquid crystal is essentially the window for the light that is generated in the background. Energizing the liquid crystal and the light simultaneously will emit a particular color. For example, if the pixel is to be red, the liquid crystal is energized during the first time segment. If a combined color is required, such as yellow, the pixel will be energized during the first (red) and third (green) sub-periods. An improved method involving four sub-periods is taught in U.S. Pat. No. 6,115,016 to Yoshihara. These color-image LCD screens use backlighting to emit the light through the liquid crystal to facilitate a screen capable of projecting color images.

Many monochrome-image LCD screens are backlit to provide better contrast between the liquid crystal and the background. This is especially important in the monochrome-image LCD screens because the display is designed such that the crystals reflect light that is incident on front surface. The liquid crystal may reflect light directly or the liquid crystal may block light that is reflected by the surface behind the crystal. As a result, these systems appear almost black when there is limited ambient light irradiating the LCD surface. The display is primarily reflecting light and if there is no light impinging upon the display there is no light to reflect. An example of this phenomenon is when you attempt to view a cellular phone or calculator LCD screen in the dark and it cannot be read. To eliminate the problems with reading the screen in low light conditions, these displays are generally provided with a backlighting system. This system provides light from behind the liquid crystal and the energized liquid-crystal blocks the light when activated.

The backlighting systems generally comprise a flat surface that is backlit or edge-lit to provide a surface of light behind the LCD panel. The lighting for these panels is generally accomplished through fluorescent, incandescent or light emitting diode (LED) lighting. The surface of light is then blocked by the energized pattern of liquid crystals providing dark areas where the crystals reside and allowing the areas of non-activated crystals to emit light from the backlit surface. The backlighting systems may come in one of several colors and provide constant lighting conditions when activated. The choice of color is generally selected by the manufacturer to provide high contrast for the image. For example, many monochrome-image LCD screens use a green backlit panel to provide high brightness behind the energized liquid crystals. Unlike the color-image screens, these screens do not produce colored pixels. The liquid crystal may transmit a small portion of the light from the back lighting system, however, the back lighting dominates any transmission and the pixel typically appears black or gray.

Another area where information can be conveyed by lighting is in the area of indicators for packages. Packages carrying virtually anything can easily be shipped around the world these days as the transportation and shipping industries continue to grow. Many packages are shipped overnight and many packages are sent through conventional means that may take weeks for the package to reach its intended destination. In all of these shipping scenarios, the quality of the product can be compromised without the shipping company or the shipper ever being aware. The first indication of shipping problems may be from the customer and this can end customer relations very quickly.

Packages are monitored for external damage by the shipper and the customer. When a customer receives a damaged box, she is automatically aware that the contents may also be damaged. The customer may still open the package but she will likely reserve her right to reject the goods if they are damaged. When goods are sensitive to shipping conditions such as, but not limited to, time, humidity, temperature, orientation, electrical conditions, physical vibration, or physical shock, the goods may be damaged due to inadequate handling. In these situations, the shipper may not be aware that the required conditions were met and the customer may receive inferior or unusable product as a result. Audible indicators are available to monitor the condition of perishable foods, see *New Food Packaging Technology to Offer Audible Warnings,* Asia Pulse, Oct. 11, 2000. There are also glass vials and spring-loaded balls that are used to show that a shock threshold has been exceeded or that a package has been turned upside down.

It would be useful to have an intelligent visual indicator indicating the shipping conditions of a package. It would also be useful to have an intelligent visual indicator for many other applications.

SUMMARY OF THE INVENTION

Illumination methods and systems are provided herein that overcome many of the drawbacks of conventional systems. In embodiments, methods and systems are provided for multicolored illumination. In an embodiment, the present invention is an apparatus for providing an efficient, computer-controlled, multicolored illumination device.

In an embodiment of the invention an information system is provided. The information system may include an LED illumination unit for displaying illumination conditions indicative of information. In another embodiment the LED illumination unit is a stand-alone device, networked device, network appliance, network peripheral, LED device, or an LED device with processor. The processor may be a controller, addressable controller, microprocessor, microcontroller, addressable microprocessor, computer, programmable processor, programmable controller, dedicated processor, dedicated controller, computer, laptop computer or other processor.

In an embodiment the illumination device may receive information signals and the information signals may be used to change the hue, saturation or intensity of the illumination device. The information signals could contain information such as financial information, environmental information, computer status information, notification information, email notification information, status information or other information. The information signal may be communicated to the LED illumination device through electromagnetic transmission, radio frequency transmission, infrared transmission, microwave transmission, acoustic transmission, wire transmission, cable transmission, network transmission or any other communication transmission. In a particular embodiment, the source of the information in the information transmission is from the world wide web (WWW), a database, a network, software, a computer, a computer system or other system. The information may also be obtained through a hyperlink or other information transfer mechanism.

The information signal may be in the form of lighting control signals that are directly readable by an LED illumination device. The information signal may also be in the form other than lighting control signals. In an embodiment, the information signal is in the form of signals other than lighting control signals and a decoder is provided to convert the information signal into a lighting control signal. In an embodiment the decoder may be a processor within the illumination device or it may be a processor separate from the illumination device. The decoder may also be software that is executed by the processor. The information signal may be a digital transmission or it may be an analog transmission. A digital transmission may be readable by the system whereas an analog system may require an analog to digital converter.

The information system may be provided with a user interface. The user interface may be used to select the information to be displayed by the illumination device. In an embodiment the user interface is a computer, personal digital assistant (PDA), computer peripheral, portable interface, stand-alone interface, or any other interface.

One embodiment is a method of providing information where an information signal is received and the information signal is communicated to an LED illumination device. The illumination unit may be associated with an input connection. A processor may be provided to convert the information signal into a lighting control signal. The lighting control signals may be communicated to the illumination control device. The hue, saturation, or intensity (color) may be changed as a result of receiving the information signal. The color may represent the information provided in the information signal. The information in the information signal may be financial information, environmental information, computer status information, notification information, email notification information, status information or any other information.

In an embodiment, a processor may be provided. The processor may be a controller, addressable controller, microprocessor, microcontroller, addressable microprocessor, computer, programmable processor, programmable controller, dedicated processor, dedicated controller, computer, laptop computer or other processor.

In an embodiment, an LED illumination device may be provided. The LED illumination device may comprise at least two LEDs wherein the at least two LEDs produce at least two different spectra; a processor; at least two controllers wherein the controllers independently control power delivered to the at least two LEDs; the at least two controllers further comprising a signal input wherein the signal input is associated with the processor; the at least two controllers are responsive to signals communicated to the signal input; and a light transmissive material wherein the LEDs are arranged to illuminate the light transmissive material.

The LED illumination device may also be associated with signal input connection. An information signal may be communicated to the signal input connection. The processor may convert the information signal into an illumination control signal; and the illumination device may change color corresponding to the information signal. A second processor may also be provided. The second processor may convert the information signal to lighting control signals. These lighting control signals may be communicated to the LED illumination device or an illumination processor associated with the lighting device.

In an embodiment a user interface is provided. The user interface may be a computer, web browser, PDA, portable device, stand-alone device, web site, touch screen, LCD screen, plasma screen, laptop computer, or any other user interface. The user interface may be used to select information to be communicated to the LED illumination device.

One embodiment is a method of converting an information signal into a lighting control signal. A user interface may be provided wherein a user selects information to be displayed by an LED illumination device. A processor may also be provided for converting the selected information into a lighting control signal and lighting control signal may be communicated to an output port. The information may be selected from a web site, web page, hyperlink, computer setting, computer system setting, email setting, computer monitor software, monitoring software, computer software or other system.

An embodiment of the invention may take the form of a computer peripheral. Where a computer sends an information signal or a lighting control signal to the peripheral and the peripheral responds by changing to a color that corresponds to the information signal. The peripheral may have a processor wherein the processor may be a controller, addressable controller, microprocessor, microcontroller, addressable microprocessor, computer, programmable processor, programmable controller, dedicated processor, dedicated controller, computer, laptop computer or other processor.

The LED illumination device may have a controller to control the LED output. The controller could be a pulse width modulator, pulse amplitude modulator, pulse displacement modulator, resistor ladder, current source, voltage source, voltage ladder, voltage controller or other power controller.

An embodiment is a method of decoding information capable of being executed by a processor. A user interface may be provided wherein images representing information are displayed. Information may be selected from the user interface. The information may be converted to a lighting control signal and the lighting control signal may be communicated to a communication port. The communication port may be a USB port, serial port, parallel port, firewire port, high-speed communication port, or other communication port.

Illumination methods and systems are provided herein that overcome many of the drawbacks of conventional illumination systems. In embodiments, methods and systems are provided for multicolored illumination. In an embodiment, the present invention is an apparatus for providing an efficient, computer-controlled, multicolored illumination capable of high performance and rapid color selection and change.

As used herein, the term "LED" means any system that is capable of receiving an electrical signal and producing a color of light in response to the signal. Thus, the term "LED" should be understood to include light emitting diodes of all types, light emitting polymers, semiconductor dies that produce light in response to current, organic LEDs, electroluminescent strips, and other such systems. In an embodiment, an "LED" may refer to a single light emitting diode package having multiple semiconductor dies that are individually controlled. It should also be understood that the term "LED" does not restrict the package type of the LED.

The term "LED" includes packaged LEDs, non-packaged LEDs, surface mount LEDs, chip on board LEDs and LEDs of all other configurations.

An LED system is one type of illumination source. As used herein "illumination source" should be understood to include all illumination sources, including LED systems, as well as incandescent sources, including filament lamps, pyro-luminescent sources, such as flames, candle-luminescent sources, such as gas mantles and carbon arch radiation sources, as well as photo-luminescent sources, including gaseous discharges, fluorescent sources, phosphorescence sources, lasers, electro-luminescent sources, such as electro-luminescent lamps, light emitting diodes, and cathode luminescent sources using electronic satiation, as well as miscellaneous luminescent sources including galvano-luminescent sources, crystallo-luminescent sources, kine-luminescent sources, thermo-luminescent sources, triboluminescent sources, sonoluminescent sources, and radioluminescent sources. Illumination sources may also include luminescent polymers capable of producing primary colors.

The term "illuminate" should be understood to refer to the production of a frequency of radiation by an illumination source. The term "color" should be understood to refer to any frequency of radiation within a spectrum; that is, a "color," as used herein, should be understood to encompass frequencies not only of the visible spectrum, but also frequencies in the infrared and ultraviolet areas of the spectrum, and in other areas of the electromagnetic spectrum.

As used herein, the term "vehicle" should be understood to refer to any vehicle such as an over-land vehicle, watercraft, aircraft, spacecraft, automobile, car, bus, truck, van, minivan, motorcycle, bicycle, moped, tricycle, tri-motorcycle, motorized cart, electric car, electric cart, electric bicycle, scooter, powered scooter, ship, boat, hovercraft, submarine, airplane, helicopter, space station, shuttle craft, commercial vehicle, recreational vehicle (RV), sport utility vehicles (SUV) or any other vehicle The term "color" should be understood to refer to any frequency of radiation within a spectrum; that is, a "color," as used herein, should be understood to encompass frequencies not only of the visible spectrum, but also frequencies in the infrared and ultraviolet areas of the spectrum, and in other areas of the electromagnetic spectrum.

In an embodiment, an information item is provided shaped like a cube or other polygon. The information item can be illuminated to reflect information or data from a related information system, such as a computer connected to a network. Examples of information displayed by the cube can be net worth, weather data, or sports scores, each reflected by illumination conditions of the item.

In an embodiment, a plurality of LEDs are used to back-light a display panel, such as an LCD display panel. The illumination can enhance the quality of the display, or it can convey information from a related information system.

In an embodiment, an illumination and information system for a vehicle is provided, where the interior or exterior of the vehicle is illuminated to reflect a state of information about the vehicle or about another object or entity. For example, a tachometer can glow a particular color to reflect engine speed.

In an embodiment, a package indicator is provided that uses illumination to reflect information about the package, including shipping information, history of the package, exposure of the item to various forces or conditions, or the like.

BRIEF DESCRIPTION OF THE FIGURES

The following figures depict certain illustrative embodiments of the invention in which like reference numerals refer to like elements. These depicted embodiments are to be understood as illustrative of the invention and not as limiting in any way.

DETAILED DESCRIPTION

The description below pertains to several illustrative embodiments of the invention. Although many variations of the invention may be envisioned by one skilled in the art, such variations and improvements are intended to be encompassed within this disclosure. Thus, the scope of the invention is not to be limited in any way by the disclosure below.

With so much information available it can be difficult to gather and display the information in a useful manner. Intelligent lighting systems that use LEDs to generate colored light in response to received signals can be used to display and indicate information of all kinds. The lighting systems can be designed to receive signals and convert them to lighting control signals or the signals can be received directly as lighting control signals.

The LED based lighting systems can drive multiple colored LEDs to produce combined colored light. With a lighting system that includes two or more different colored LEDs, combinations of those colors can be generated to the extent the level of intensity or color shifting of the individual LEDs can be controlled. In a preferred embodiment, the LEDs are controlled with a microprocessor to provide pulse width modulation control to three colors of LEDs. The microprocessor is associated with a program input and input signals can be communicated to the program input. When input signals are communicated to the program input the microprocessor can generate LED control signals to produce colored light that is associated with the input.

Figure 1:
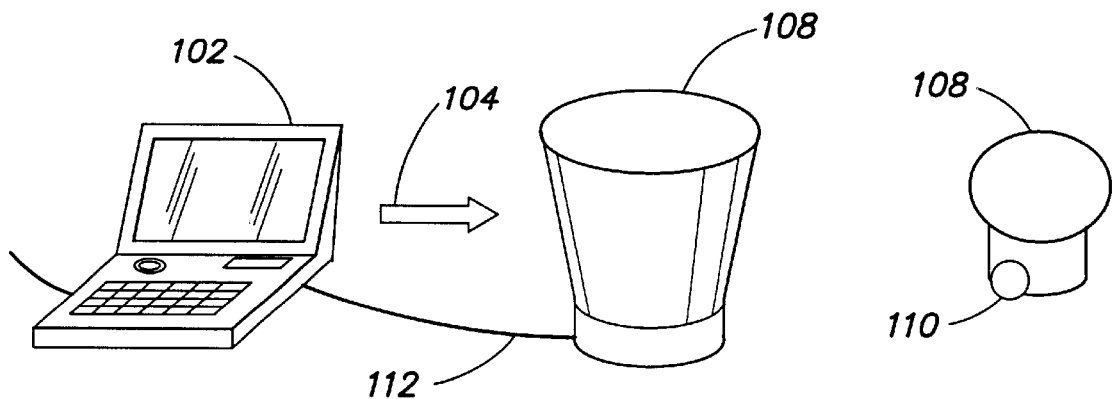
FIG. 1 is a system diagram depicting components of an information system with an illumination component as disclosed herein.

FIG. 1 illustrates a computer network that includes a computer 102 and a transmitter 112 or 104 for transmitting signals. The computer 102 may be a laptop computer, personal computer, wireless device, handheld device, game console, server, mainframe, microcomputer, network computer, appliance, handheld game, personal digital assistant, cellular phone, or other suitable computer or other information system capable of relaying information. The transmitter can be any transmitter for communicating signals such as, but not limited to, electromagnetic, IR, RF, microwave, acoustic, wire, cable, or network. The transmitter is for communicating program signals to a lighting device 108. The lighting device could be equipped with a receiver 110 for receiving the signals, which may be any receiver capable of receiving a signal transmitted by the applicable transmitter 112 or 104. When the lighting device receives the program signals it can generate a particular color or illumination effect. The color or effect may be indicative of the signal received. For example, the transmitted information may be financial information regarding the stock price of a company. Information regarding the stock price could be communicated to the lighting device and the lighting device could produce light or lighting effects. As a stock price rises, the light could produce green light, when it falls, the light could change to red. The light could indicate the rate of rise or decline by changing saturations of the colors blue and yellow. If the stock price reaches a high enough level, the light could begin to flash on and off green to catch the users eye. A dramatic drop could initiate a flashing red light. The lighting device could produce continually changing colors at the close of the market. Since color is a composite of hue, saturation and brightness these three parameters can reflect multiple pieces of information. For example, a stock value may be represented by the hue, a market shift may be represented by brightness, and the rainfall outside may be represented by saturation.

A plurality of lighting devices could also be used to generate coordinated effects. The program signals could be directly received from the original source, the computer in this example, or the signals could be retransmitted through another device. One such method of re-transmitting the signals would be to allow the lighting device to complete the communication. The lighting device could be equipped with a separate transmitter or the LEDs used for lighting could be used for the dual purpose of lighting and communicating. There are many other methods of transmitting information such as, but not limited to, electromagnetic transmission, RF, IR, microwave, wire, cable, network, telephone transmission or over the power connections. A plurality of lighting devices could also be used to receive separate channels of information. One lighting device could receive one type of information for display and another device could be used for receiving another signal.

The information to be displayed could also be received from the World Wide Web or through other networks where information is transferred. For example, the computer could receive information from a network and the information could be communicated to the lighting device. The information could also be received from other networks including, but not limited to, satellite networks, communication networks, or telecommunication networks. The lighting device could be equipped with a receiver for receiving such information and respond by producing colored light when certain signals are received.

Figure 3:
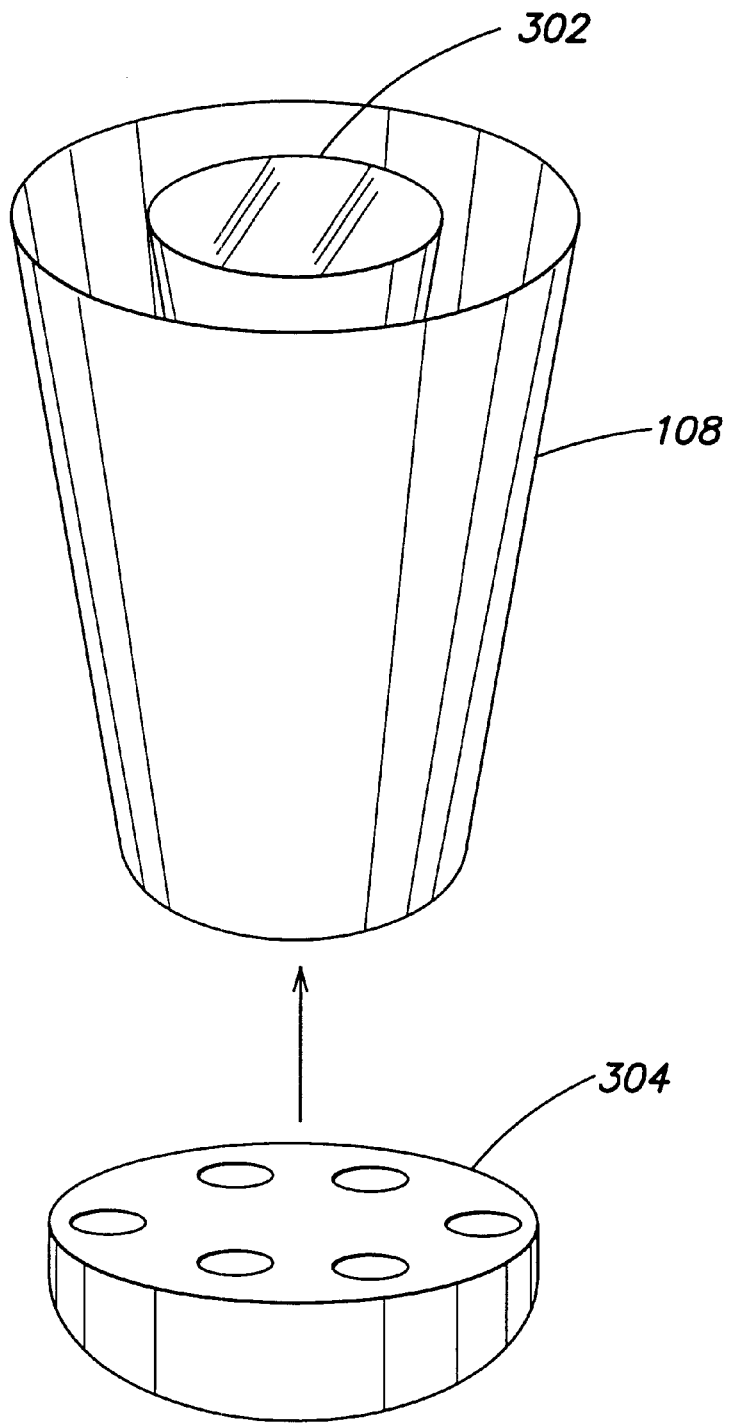
FIG. 3 depicts an embodiment of an illumination component of an information system of FIG. 1.

FIG. 3 illustrates one style LED lighting device. The LEDs 304 and control unit may be attached to a material such as but not limited to, a shade, fabric, diffusing material, semi-translucent material, plastic, plastic dome, sculpted material or any other material. The material may be selected for its absorption or transmission properties to maximize the effect of the colored light. In a preferred embodiment a parchment is formed into a spiral such that the inner and outer sections of the spiral absorb, reflect and transmit the colored light. FIG. 3 also illustrates another method of forming a shade. The shade includes several wraps 108 and 302 for distributing the lighting effects. The lighting device may also direct the illumination without the aid of a shade or other material.

Figure 4:
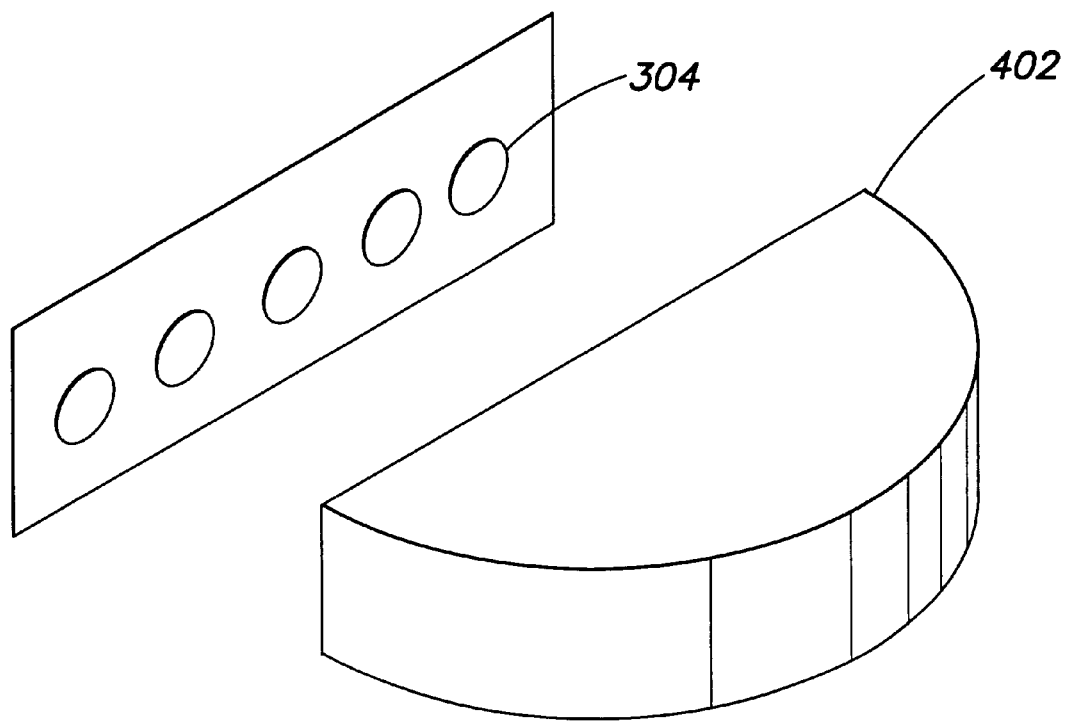
FIG. 4 depicts a sconce embodiment of an illumination and information system.

The lighting device can take on many forms such as, but not limited to, a table mounted device, a wall mounted device, a ceiling mounted device, or a floor mounted device. FIG. 4 illustrates a wall-mounted device that may take on the appearance of being a sconce. Where the LEDs 304 are mounted in a position to shine on the shade 402.

Figure 5:
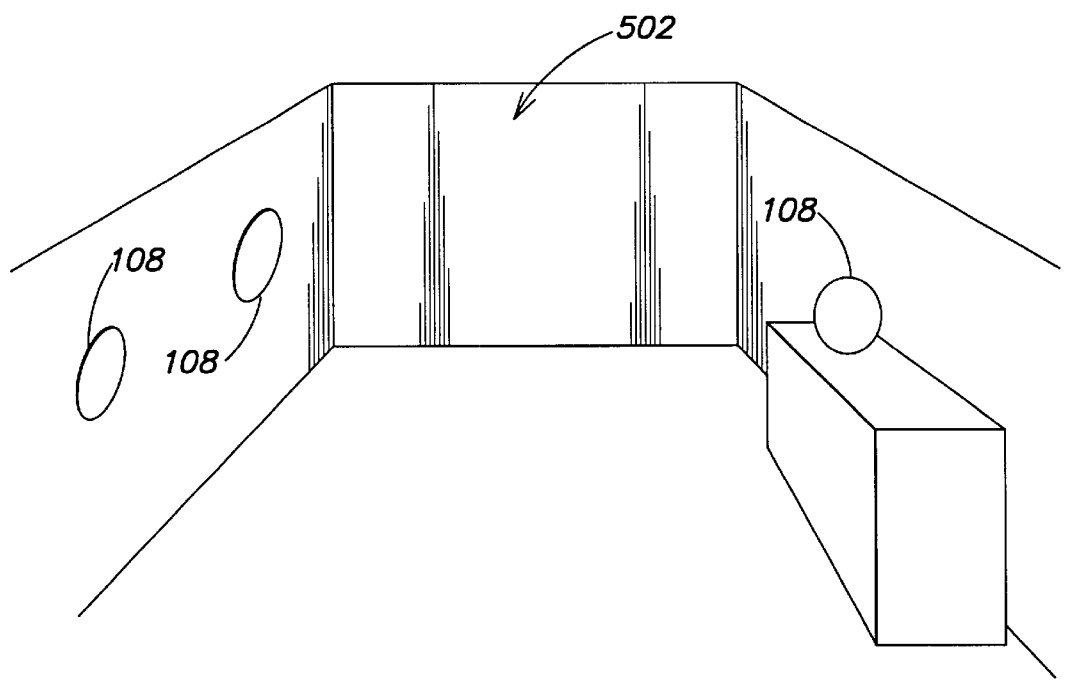
FIG. 5 depicts a room environment for an illumination and information system.

FIG. 5 illustrates a room where one or more lighting devices 108 may be located. These lighting devices may produce coordinated lighting effects or each one may produce standalone effects. Coordinated effects can be accomplished in many ways such as, but not limited to, using one lighting device as a master with the others acting as slaves, sending addressed information to the lighting devices wherein the lighting devices have addressable controllers, or a combination of these methods. In the master-slave set up, one lighting device may receive program signals and then pass on new or the same program signals to the other lighting devices. The lighting device may also pass on part of the information received. The second method could be referred to as a network solution where each of the lighting devices is listening for the signals that pertain to it. Upon receiving the addressed information, the lighting device could initiate the illumination conditions.

Figure 6:
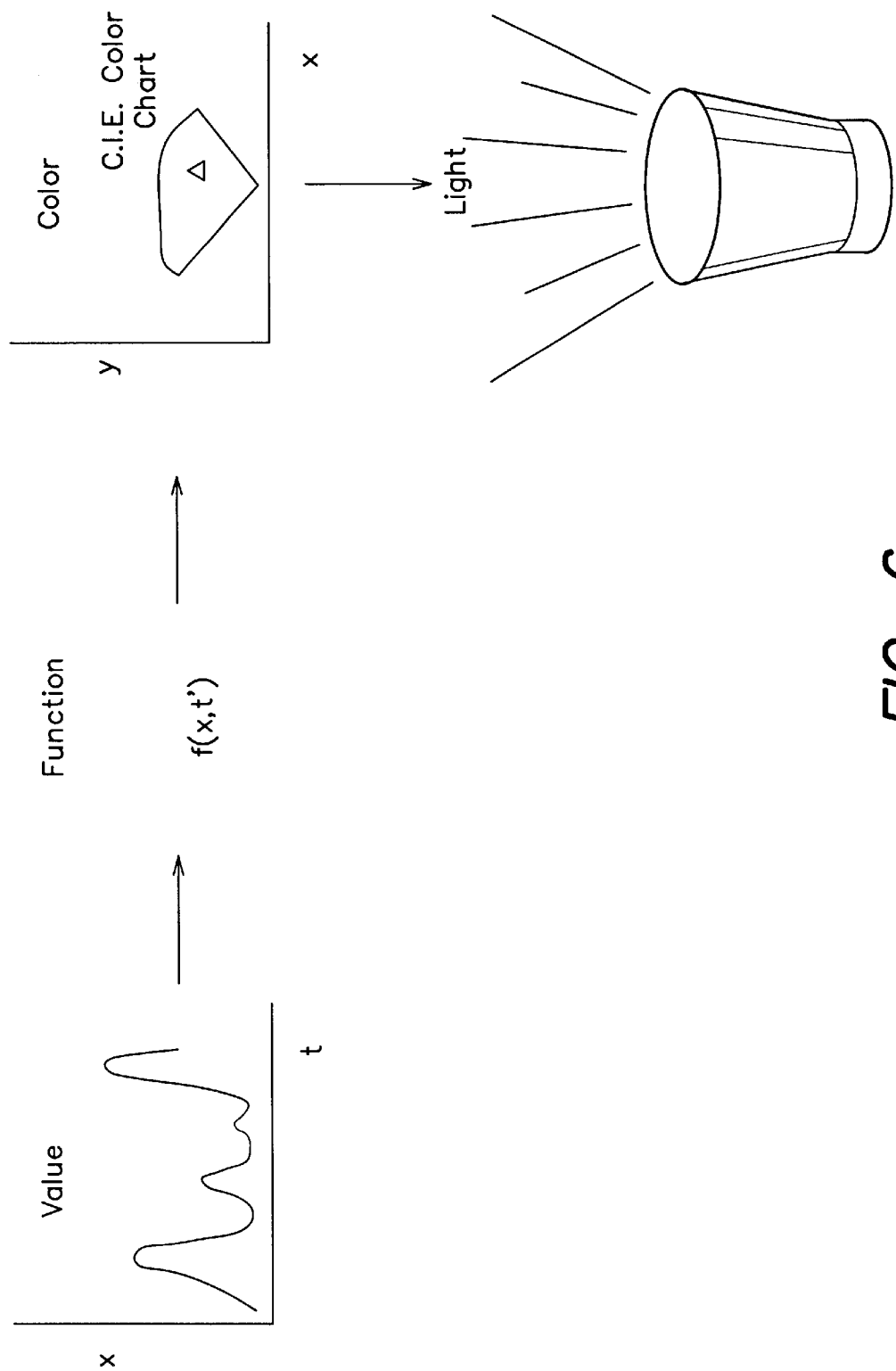
FIG. 6 depicts a flow diagram for conversion of an item of information into a specified type of illumination.

FIG. 6 depicts a flow diagram to illustrate how the information may be converted into lighting conditions in a preferred embodiment. The value of the information may be received by a system and this information may be converted to a lighting function. The lighting function in turn is then converted into lighting control signals corresponding to a particular hue, saturation and intensity. These control signals are then communicated to the lighting device and the lighting device produces the desired illumination conditions.

Figure 2:
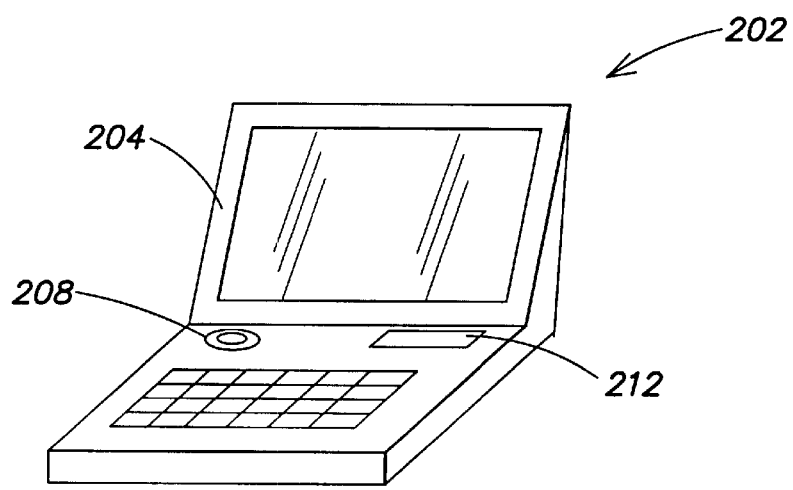
FIG. 2 depicts a laptop computer equipped with an illumination component.

The lighting device can also be incorporated into another device. FIG. 2 illustrates a laptop computer 202 with two lighting devices 208 and 212, one surrounding the on-off switch for the computer 202 and one independent of other switches. These lighting devices could be used to generate colored light to inform the user of any information including, but not limited to, information received from a network or information regarding the performance of the machine. The button indicator 208 may be used to alert the user when the laptop is going into sleep mode before it goes to sleep. This would be useful during presentations to avoid the system from shutting off at a critical point. The other indicator 212 may be used to indicate battery life or other operational conditions such as, but not limited to, processor speed, down load speed, temperature outside as received from an external signal like the world wide web. The indicator can also take on any shape. For example, the edge 204 surrounding the computer screen could be used as an indicator. The edge lighting or any other lighting could be broken up into separate channels for receiving and displaying different information. Individual buttons on the keyboard could also be used as indicators as well as keys.

Another example of where the lighting device can be used to convey information is in a computer, computer room or server room. The server room or server building is a very complicated area that is also the show place of many businesses. Many server and networks are monitored by software dedicated to reviewing the condition of the system. These programs monitor everything from network traffic to individual fan speeds on network devices. The software monitors all aspects of the network or individual device to allow the network manager to optimize the systems performance and prevent breakdowns. It would be useful to provide an intelligent lighting device for monitoring the system and alert the network manager of the system conditions.

A lighting device could be provided to fit into an existing port on a server or system such as, but not limited to, a rack mount enclosure, a 5 ¼" drive slot or a 3 ½" drive slot. The lighting device could also be a separate device. The lighting device can use also the heat sinking provided by the existing slot on a server or other computer. The lighting system could be associated with the network software and the software could be tailored to provide overall operational characteristics of the system or the network manager may decide to monitor a particular parameter. The system may be indicating overall acceptable performance with a particular parameter declining in performance. This may result in a particular light pattern from the lighting device. The light pattern may be green with an intermittent yellow emitted every five seconds. This would provide information to the manager to check the system even though everything is operating. The lighting device could begin to turn red as the system slows down and it could be programmed to strobe red when the system is in a critical condition.

Another useful example of an information system is where it is used to provide information as to when a task is completed. Computers or other devices may be tied up performing calculations or tasks and the device should not be touched while the system is performing these functions. The device may send lighting signals to the illumination device to alert others not to touch the device. These signals may instruct the illumination device to illuminate red while the device is performing calculations and may begin to change color until arriving at the color green when the calculations are complete.

Many computer rooms have raised floors, false ceilings or walls for passing all of the wires and cables. The tiles in the floor, ceiling and or wall are typically removable to allow access to the wires and cables. One or more of these tiles could also be replaced with a lighting device to provide lighting or information. An embodiment of such tiles were disclosed in U.S. patent application Ser. No. 09/215,624. A separate panel of lighting devices could also be provided to allow the display of various channels or various levels.

Hard drives in network storage areas are many times made to be accessible to the user. These drives may have LED indicators to indicate activity or power or fault. These indicators are typically single color low output LEDs that flash to make the indication. For example, the indicator for activity may flash every time the drive is accessed. The user looks at the flashing rate of the indicator to get an idea of the usage rate. When you view a large panel of drives you typically see many green indicators flashing and it is very difficult to discern on drive from the next. An embodiment of the invention system could be used in such a drive to provide color or color changing effects as an improved information system. The information lighting system could be in the form of an indicator panel, light, or the entire front plate or enclosure may be used. One embodiment of this is disclosed in U.S. Provisional Patent Application Ser. No. 60/221,579 "Color Changing Device and Enclosure." These hard drives are sometimes referred to as Hot Swap Hard Drives, Modular Drives, Modular Bays and are sold by Dell, EMC and others. This system could be used in the drive for easy display of information regarding the drive performance, life expectancy, life, temperature, spindle speed or any other information. The drive can also be put into a self-test mode and the lighting device could be used to provide information of the test status or result.

Figure 7:
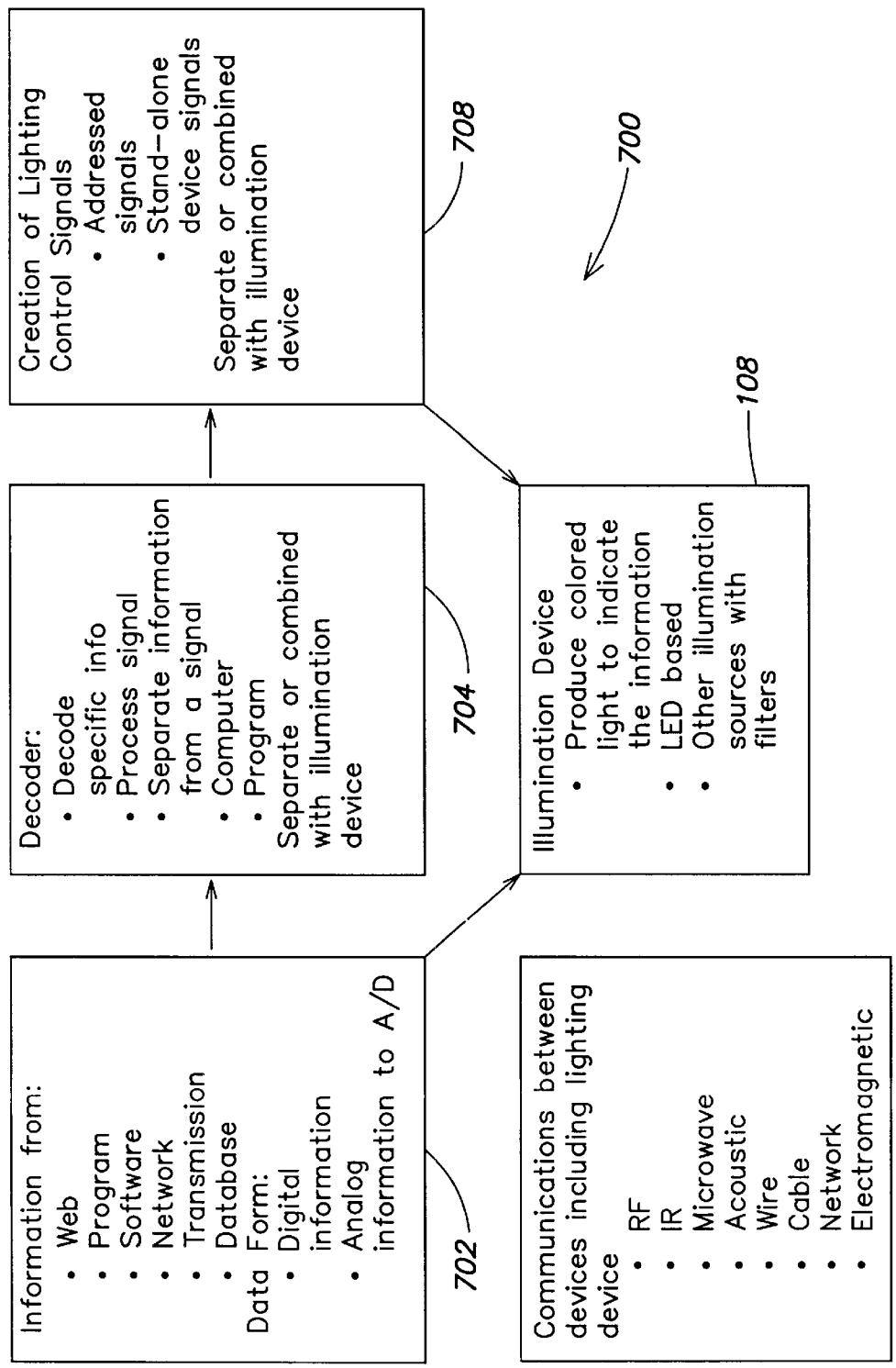
FIG. 7 is a flow diagram for steps for converting information into illumination.

Turning to the flow chart 700 in FIG. 7, the information system may include an LED illumination unit 108 for displaying illumination conditions indicative of information. The LED illumination 108 unit may be a stand-alone device, networked device, network appliance, network peripheral, LED device, LED device with processor, or other illumination device capable of changing the illumination conditions in response to a signal. A processor may also be provided in or associated with the lighting device and the processor may be a controller, addressable controller, microprocessor, microcontroller, addressable microprocessor, computer, programmable processor, programmable controller, dedicated processor, dedicated controller, computer, laptop computer or other processor.

The illumination device 108 may receive information signals directly and the information signals may be used to change the hue, saturation or intensity of the illumination device. The information signals may contain information such as financial information, environmental information, computer status information, notification information, email notification information, status information or other information. The information signal may be communicated to the LED illumination device through electromagnetic transmission, radio frequency transmission, infrared transmission, microwave transmission, acoustic transmission, wire transmission, cable transmission, network transmission or any other communication transmission.

The source of the information at the step 702 may be from the world wide web (WWW), a database, a network, software, program, computer, or other system. The information may also be obtained through a hyperlink or other information transfer mechanism. The information may be in the form of a digital signal or an analog signal where the analog signal is converted to a digital signal for processing. Once the information is obtained, it may not need to be decoded at the step 704. The decoding process may involve deciphering the pertinent information form the remaining information in the signal. For example, an entire web page may be down loaded from the World Wide Web and the only information the user wants to send to the lighting device pertains to the snowfall accumulation in Grand Rapids, Mich. The snowfall information would then be decoded or retrieved from the other information to be further processed.

Following the decoding process at the step 704, the information may need to be transformed into lighting control signals at the step 708. This may be a process executed on a processor to convert the format of the information into lighting control signals that can be executed by the lighting device. For example, the information retrieved from the World Wide Web concerning the snowfall accumulation may be in the format of inches per hour. This value may need to be converted into lighting control signals to produce a particular hue, saturation or intensity of the illumination device.

The elements described in the flow diagram 700 of FIG. 7 may all be incorporated into the illumination device or they may reside in different devices. Where communications between the elements is required, the communication can be accomplished through radio frequency, infrared, microwave, acoustic, wire, cable, network, electromagnetic or other communications method.

Referring again to FIG. 1, the information system may also be provided with a user interface 102. The user interface may be used to select the information to be displayed by the illumination device. In an embodiment the user interface may be a computer, personal digital assistant (PDA), computer peripheral, portable interface, stand-alone interface, web browser, PDA, portable device, stand-alone device, web site, touch screen, LCD screen, plasma screen, laptop computer, or any other user interface. The user interface may be used to select information to be communicated to the LED illumination device. For example, the interface may select the information from a web page to be displayed. The user interface may allow the user to select various information and the information may then be converted to lighting control signals.

Figure 8:
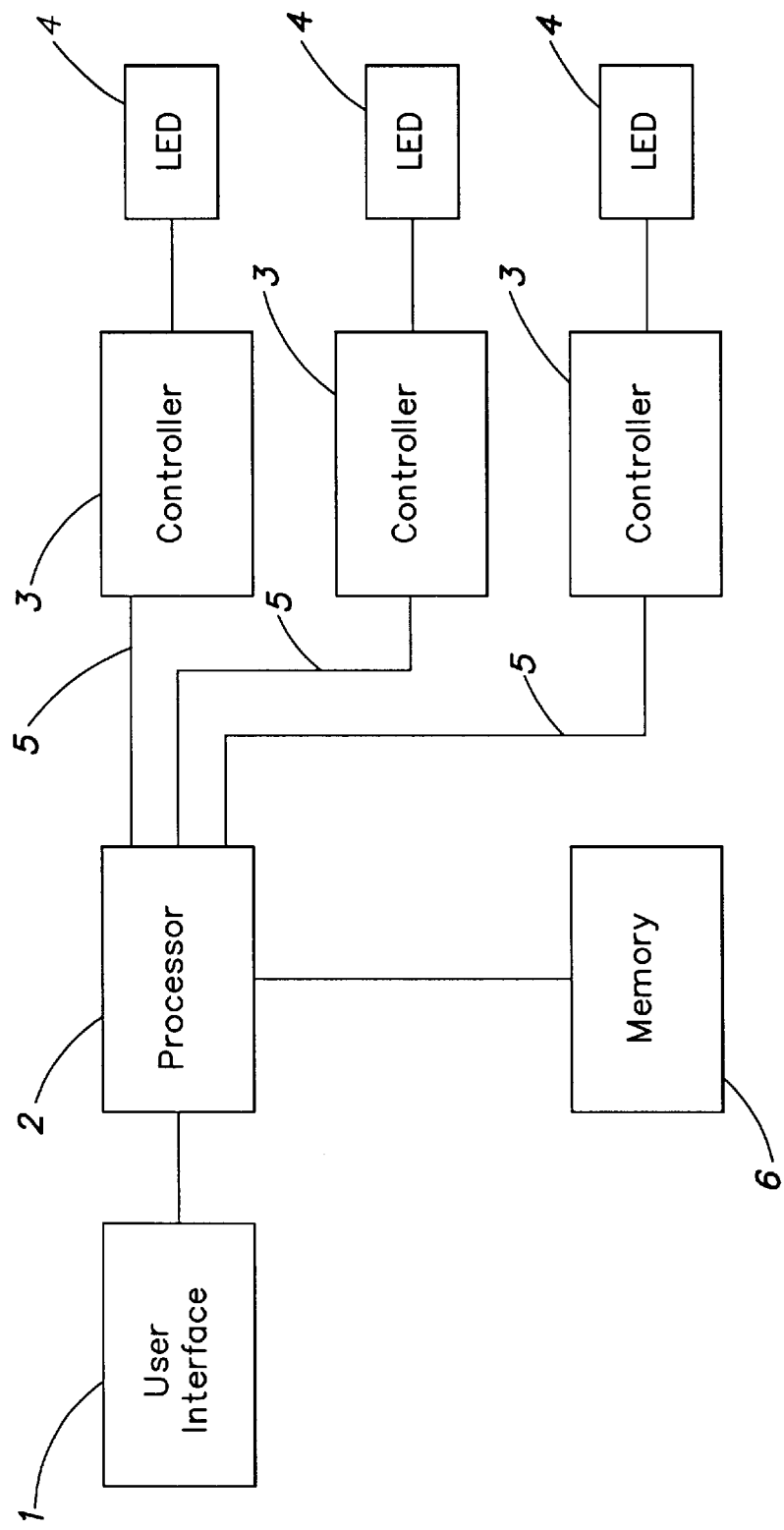
FIG. 8 is a schematic diagram of elements for illumination control.

FIG. 8 illustrates a block diagram of a system according to the principles of the invention. A processor 2 is associated with several controllers 3. The controllers 3 control the power to the LEDs 4. The processor 2 may be any processor or circuit to provide the control signals to the controllers 3 such as, but not limited to, a controller, addressable controller, microprocessor, microcontroller, addressable microprocessor, computer, programmable processor, programmable controller, dedicated processor, dedicated controller, application specific integrated circuit, integrated circuit, control circuit or other processor. In an embodiment, the processor 2 is Microchip PIC processor and the LEDs 4 may be red, green and blue. The controller 3 may be a pulse width modulator, pulse amplitude modulator, pulse displacement modulator, resistor ladder, current source, voltage source, voltage ladder, switch, transistor, voltage controller, or other controller. The controller controls the current, voltage or power through the LED 4. The controller also has a signal input wherein the controller is responsive to a signal received by the signal input. The signal input is associated with the processor such that the processor communicates signals to the signal input and the controller regulates the current, voltage and or power through the LED. In an embodiment, several LEDs with different spectral output may be used. Each of these colors may be driven through separate controllers. The processor and controller may be incorporated into one device. This device may power capabilities to drive several LEDs in a string or it may only be able to support one or a few LEDs directly. The processor and controller may also be separate devices. By controlling the LEDs independently, color mixing can be achieved for the creation of lighting effects. Electronic memory 6 may also be provided. The memory 6 is capable of storing algorithms, tables, files, or values associated with the control signals. In an embodiment, the memory 6 may store programs for controlling the LEDs 4. A program, for example, may store control signals to operate several different colored LEDs 4. A user interface 1 may also be associated with the processor 2. The user interface may be used to select a program from memory, modify a program from memory, modify a program parameter from memory, select an external signal or provide other user interface solutions. Several methods of color mixing and pulse width modulation control are disclosed in U.S. Pat. No. 6,016,038 "Multicolored LED Lighting Method and Apparatus" and is incorporated by reference herein. The processor 2 can also be addressable to receive programming signals addressed to it.

The LED illumination device may also be associated with signal input connection. An information signal may be communicated to the signal input connection or receiver 110. The processor may convert the information signal into an illumination control signal; and the illumination device may change color corresponding to the information signal. A second processor may also be provided. The second processor may convert the information signal to lighting control signals. These lighting control signals may be communicated to the LED illumination device.

An embodiment of the invention is a method of decoding information capable of being executed by a processor. A user interface may be provided wherein images representing information are displayed. Information may be selected from the user interface. The information may be converted to a lighting control signal and the lighting control signal may be communicated to a communication port. The communication port may be a USB port, serial port, parallel port, firewire port, high-speed communication port, optical port or other communication port.

An example of a software program designed to collect information and convert the information to lighting control signals is in DMXPlayerFrame.java written by Brian Chemel. The code of the program is included as part of this specification and is labeled as Appendix A, which appears before the claims herein.

In another embodiment, a lighting device could also be incorporated into an appliance to indicate the appliance activity. An example of this would be where a lighting device is incorporated into an iron. The lighting device could indicate the temperature of the hot plate. The indicator could be associated with a temperature sensor, timer or other device for indicating the condition of the iron. As the iron warms up, the lighting device could slowly change from blue, to green, yellow and finally red when the desired temperature is achieved or when the device is above a predetermined temperature. The entire enclosure could be lit or a portion of the enclosure could be lit. The lighting device could also indicate any other parameters of the appliance. The water level in the appliance may be monitored and the information may be converted to light control signals to generate a particular illumination effect.

The lighting device can produce a wide range of hue, saturation and intensity and each of these parameters can be independently changed. Each of the parameters may be used to indicate different information. For example, if the system is monitoring stock price, the hue could change as a result of the stock price exceeding a predetermined value and the saturation could change as a result of how far in excess the stock value has reached compared to the predetermined value. Another example would be where the hue is indicative of a parameter and intensity and saturation are indicative of a level of the parameter. The lighting device may be monitoring a stock portfolio and the temperature in the Cayman Islands. The hue of red may indicate the lighting device is monitoring the stock portfolio and the hue of green may indicate the temperature. The intensity or saturation of the particular hue may increase as the portfolio or temperature increase.

These devices can also be designed to respond or send information to another device. The device could be associated with sensors, transducers, or other devices for monitoring the activity around or of the device. For example, the device could be associated with a sensor such that when the device is picked up it sends a signal to another device such as, but not limited to, a network. This signal could then be interpreted by another device for further action.

A lighted keyboard could also be used to teach typing or indicate other information. In teaching, the indicators located under each key could be single LEDs to produce only one color or they could contain multiple colored LEDs. The keys could light when the student is suppose to touch certain keys and the keys could change colors if the instructions were not followed. Games could also be created using the colored or lit keys.

Another embodiment of the present disclosure employs a combination of an information system and a lighting device in a vehicle. In vehicle applications, a LED lighting device may be used to light the interior, exterior, within the vehicle or associated with the vehicle. Reasons for vehicle illumination may be to provide general illumination, for decorative purposes, for observation of instruments, for information conveyance, or for any other purpose. See U.S. patent application Ser. No. 09/213,607 "Systems and Methods for Sensor-Responsive Illumination." The dashboard of the vehicle may be illuminated with an LED device with color changing ability and this lighting device may change colors as the result of a manual input, a sensor input, a transducer input or any other input.

The block diagram of FIG. 8 illustrates a block diagram suitable for an illumination-based vehicle information system according to the principles of the invention. As with other information systems disclosed herein, processor 2 is associated with several controllers 3. The controllers 3 control the power to the LEDs 4. As used herein, the term processor may refer to any system for processing electronic signals. A processor may include a microprocessor, microcontroller, programmable digital signal processor, other programmable device, a controller, addressable controller, addressable microprocessor, computer, programmable processor, programmable controller, dedicated processor, dedicated controller, integrated circuit, control circuit or other processor. A processor may also, or instead, include an application specific integrated circuit, a programmable gate array, programmable array logic, a programmable logic device, a digital signal processor, an analog-to-digital converter, a digital-to-analog converter, or any other device that may be configured to process electronic signals. In addition, a processor may include discrete circuitry such as passive or active analog components including resistors, capacitors, inductors, transistors, operational amplifiers, and so forth, as well as discrete digital components such as logic components, shift registers, latches, or any other separately packaged chip or other component for realizing a digital function. Any combination of the above circuits and components, whether packaged discretely, as a chip, as a chipset, or as a die, may be suitably adapted to use as a processor as described herein. It will further be appreciated that the term processor may apply to an integrated system, such as a personal computer, network server, or other system that may operate autonomously or in response to commands to process electronic signals such as those described herein. Where a processor includes a programmable device such as the microprocessor or microcontroller mentioned above, the processor may further include computer executable code that controls operation of the programmable device. In an embodiment, the processor 2 is Microchip PIC processor 12C672 and the LEDs 4 may be red, green and blue.

The controller 3 may be a pulse width modulator, pulse amplitude modulator, pulse displacement modulator, resistor ladder, current source, voltage source, voltage ladder, switch, transistor, voltage controller, or other controller. The controller controls the current, voltage or power through the LED 4. The controller also has a signal input wherein the controller is responsive to a signal received by the signal input. The signal input is associated with the processor such that the processor communicates signals to the signal input and the controller regulates the current, voltage and or power through the LED. In an embodiment, several LEDs with different spectral output may be used. Each of these colors may be driven through separate controllers. The processor and controller may be incorporated into one device. This device may power capabilities to drive several LEDs in a string or it may only be able to support one or a few LEDs directly. The processor and controller may also be separate devices. By controlling the LEDs independently, color mixing can be achieved for the creation of lighting effects. Electronic memory 6 may also be provided. The memory 6 is capable of storing algorithms, tables, or values associated with the control signals. The memory 6 may store programs for controlling the LEDs 4. The memory may be memory, read-only memory, programmable memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, address information, and program output or other intermediate or final results. A program, for example, may store control signals to operate several different colored LEDs 4. A user interface 1 may also be associated with the processor 2. The user interface may be used to select a program from memory, modify a program from memory, modify a program parameter from memory, select an external signal or provide other user interface solutions. Several methods of color mixing and pulse width modulation control are disclosed in U.S. Pat. No. 6,016,038 "Multicolored LED Lighting Method and Apparatus" and is incorporated by reference herein. The processor 2 can also be addressable to receive programming signals addressed to it.

Another useful interface is an interface that is associated with a power source. An energy storage element can be associated with a power source. The energy storage device can also be associated with a processor. The energy storage element may be a capacitor, non-volatile memory, battery backed memory, relay, storage device or other energy storage element. The element may communicate a logic high and a logic low signal to the processor depending on the state of the element. For example, the element may communicate a low logic signal when the device is connected to the power source and a high logic signal when the device is disconnected from the power source. The high logic signal may change to a low logic signal following a predetermined period of time and the processor may be monitoring the signal. The lighting device could be programmed such that a last lighting program may be operating when the device is de-energized. If the device is re-energized within a predetermined period, while the logic signal is still high, the device may select a new program from memory to execute. If the device is not re-energized within the predetermined period, the device may start up in the last lighting program or a default program. A non-volatile memory, battery backed memory or other memory may be provided such that the last program is remembered. The technique can be used to change the program, a program parameter or other setting. This technique can be used in a device that does not include a separate user interface by turning the power to the lighting device off and on. A separate switch could also be employed to provide the user interface as well as an on/off switch.

Figure 10:
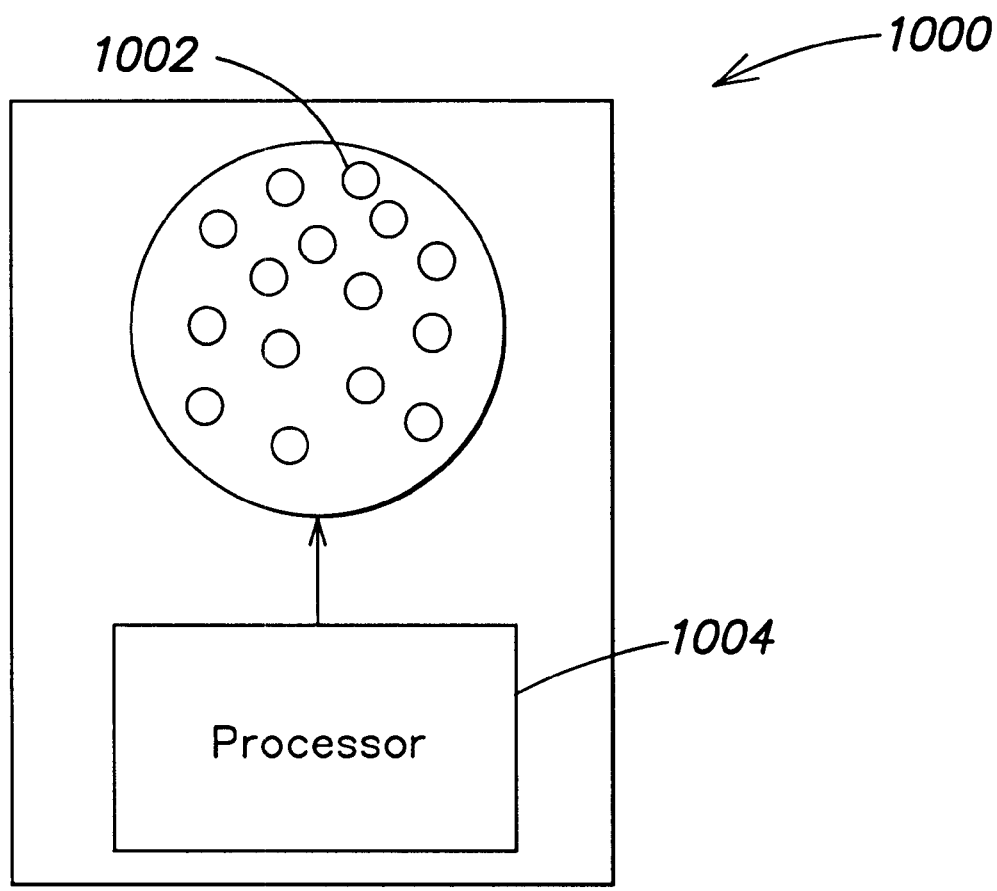
FIG. 10 is a schematic diagram of elements of an illumination system.

Sections of a vehicle can be lit with LEDs to produce many different illumination effects. FIG. 10 depicts an LED lighting device 1000 that includes at least one LED 1002 and a processor 1004. The processor can be a device such as a processor, a microprocessor, a circuit, a computer, a microcomputer, a controller, a network or other processor for controlling the LEDs to produce illumination. The processor 1004 will be associated with the LEDs 1002 to control the LED 1002 output and the processor 1004 may be incorporated into the lighting device or may be remotely located. The lighting device can be powered through external methods or on-board methods. The system may be adaptable for attaching to an A.C. source or D.C. source. The on-board solutions include providing a battery, cell, solar system, rechargeable system, wind system, water system or any other system for supplying power to the system.

An object can be lit with one or more LEDs to provide illumination. Where one LED is used, the object may be lit with a single color with varying intensity or the intensity may be fixed. In a preferred embodiment, the object being lit includes more than one LED and in another embodiment the LEDs are different colors. By providing a lighted object with different colored LEDs, the hue, saturation and brightness of the object can be changed. The two or more LEDs can be used to provide additive color. If two LEDs were used to light the object with circuitry to turn each color on or off, four colors could be produced including black when neither LED is energized, two LEDs with two intensity levels yields $2^2$ colors. Another example is where three LEDs are used to light the object and each LED has three intensity settings. This configuration yields $3^3$ or 27 color selections. In a preferred embodiment, the LED control signals would be PWM signals generated by a microprocessor using three LED channels with at least one LED per channel to generate 16.7 million colors.

Figure 11:
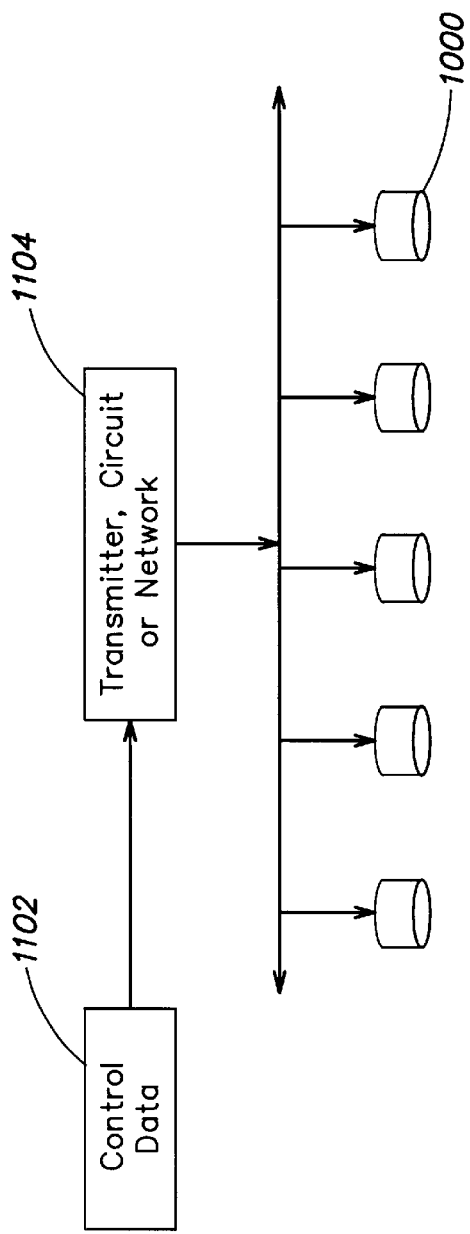
FIG. 11 is a schematic diagram of a networked illumination system.
Figure 12:
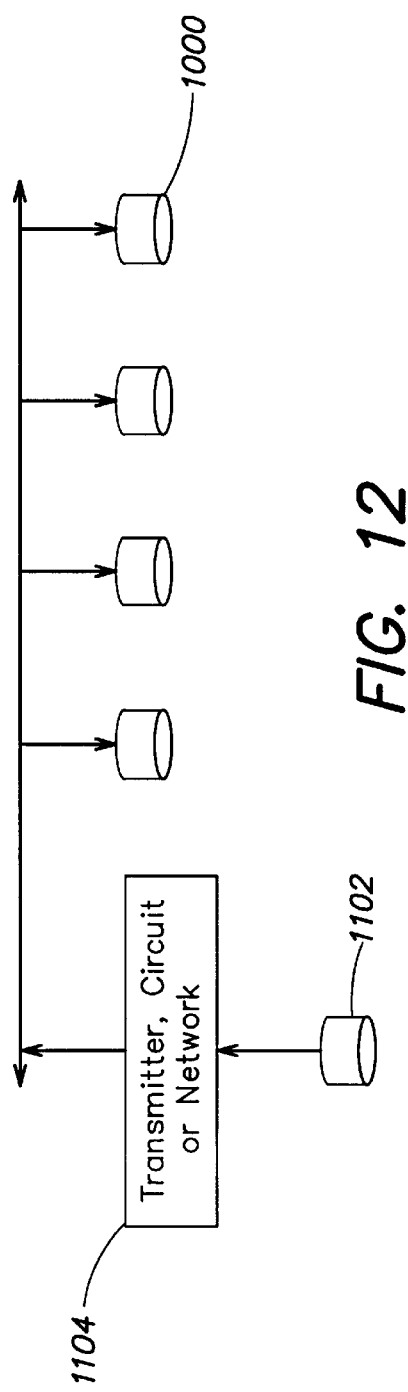
FIG. 12 is a schematic diagram of an alternative embodiment of a networked illumination system.

The lighting devices could also be networked together to provide for coordinated effects or other effects. FIG. 11 illustrates one such network solution. A plurality of lighting devices 1000 are associated through a network 1104. The network 1104 could provide lighting control signals 1102 through a transmitter, circuit or network 1104 to the devices 1000 and the devices may have addressable controllers for receiving the lighting control information. The network could use any communication method such as wire, cable, network, electromagnetic transmission, RF transmission, IR transmission, microwave transmission or any other communication method. Packets of addressed information may be sent through the network and the individual or groups of lighting devices could be waiting listening for its address and then executing the lighting control commands upon receipt of its packet. The packets of information may also be sent to all of the lighting devices and the devices may not have addressable controllers. Another configuration of a networked system would be using a master lighting device 1102 and at least one slave device 1000 as depicted in FIG. 12. The master device could communicate lighting instructions to the slave device and several slave devices could have addressable controllers to provide coordinated effects.

Many of the illumination applications could also use stand-alone devices providing individual lighting effects. The lighting device could be associated with a user interface to select a program from memory for example. The lighting device could also include a data port for receiving new programs. The lighting device could be programmed with a plurality of lighting control routines to be selected by the user such as different solid colors, slowly changing colors, fast changing colors, stobing light, or any other lighting routines. The selector switch could be used to select the program. Another method of selecting a program would be to turn the power to the lighting device off and then back on within a predetermined period of time. For example, non-volatile memory could be used to provide a lighting device that remembers the last program it was running prior to the power being shut off. A capacitor could be used to keep a signal line high for 10 seconds and if the power is cycled within this period, the system could be programmed to skip to the next program. If the power cycle takes more than 10 seconds, the capacitor discharges below the high signal level and the previous program is recalled upon re-energizing the system. Other methods of cycling through the programs would be obvious to those skilled in the art.

The lighting device could also receive external signals and generate illumination conditions corresponding to the received signal. This may be a useful technique for changing illumination conditions in response to a sensor, transducer, signal, network signal or other signal. The sensors may be equipped to receive communication signals such as electromagnetic, RF, microwave, IR, acoustic or other signals. The reception of the communication signals may be accomplished through wire, cable, network, receiver, electromagnetic receiver, acoustic receiver or any other suitable receiver. The communication signals may be transmitted as lighting control signals to be used by the lighting device or the signals may require some transformation, interpretation, signal processing or other process step to be converted into lighting control signals. For example, a sensor may feed an analog voltage to the lighting device and the lighting device may convert the voltage to a digitized signal to control the LEDs. The control signal sent to the LEDs may correspond to the sensor voltage to create illumination effects that correlate with the sensor voltage.

In vehicle applications, a LED lighting device may be used to light the interior, exterior, within the vehicle or associated with the vehicle. Reasons for vehicle illumination may be to provide general illumination, for decorative purposes, for observation of instruments, for information conveyance, or for any other purpose. See U.S. patent application Ser. No. 09/213,607 "Systems and Methods for Sensor-Responsive Illumination." The dashboard of the vehicle may be illuminated with an LED device with color changing ability and this lighting device may change colors as the result of a manual input, a sensor input, a transducer input or any other input.

Figure 9:
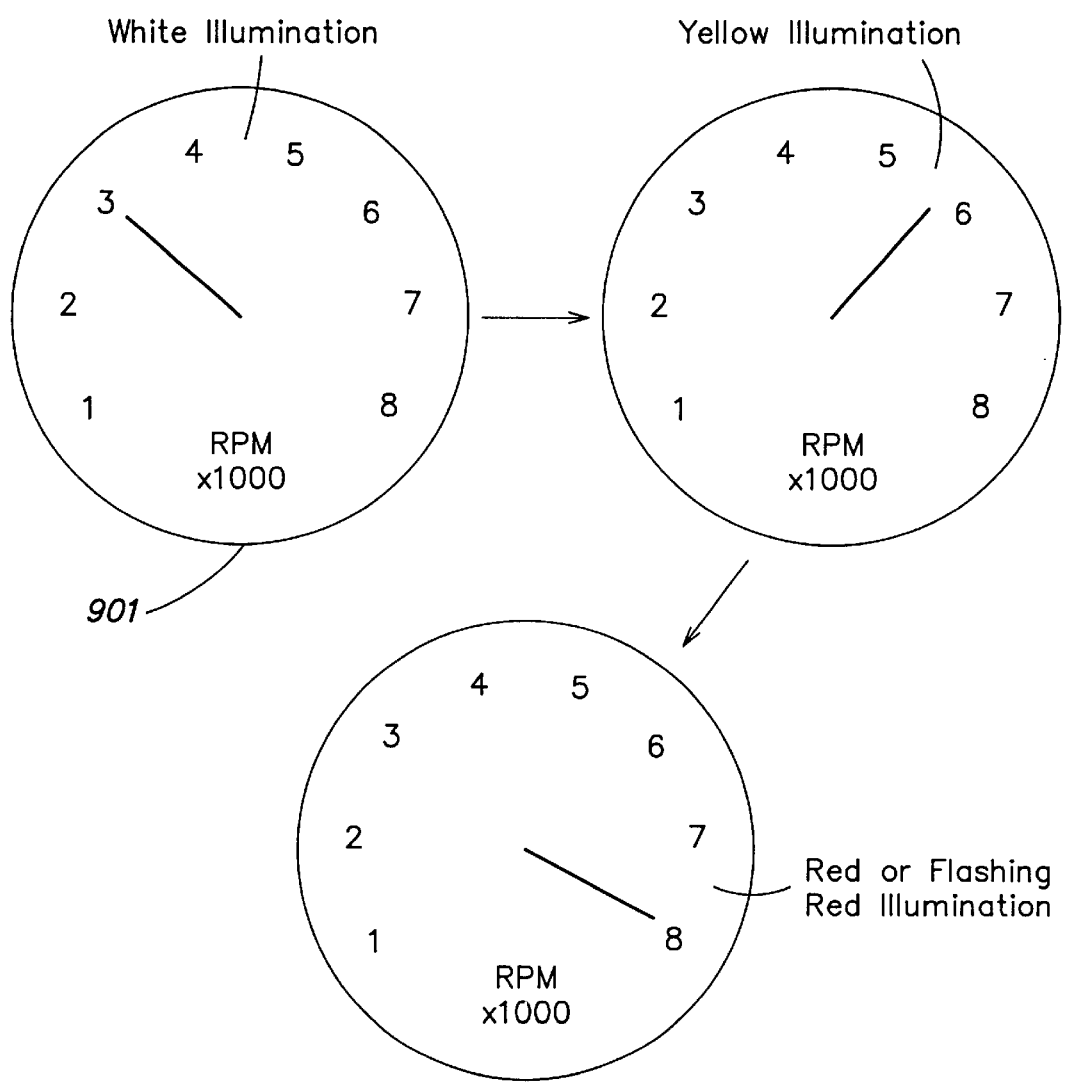
FIG. 9 is a depiction of a tachometer embodiment of an illumination system for a vehicle.

As an example, a lighting device may be provided wherein the lighting device includes a combination of two different colored LEDs. This lighting device may be used to light an instrument panel, portion of an instrument panel or specific instrument on the vehicle's dashboard, such as the tachometer. FIG. 9 depicts a tachometer 901. The lighting device could receive signals from various segments of the vehicle that are monitoring engine speed. This engine speed could then be transmitted to the lighting device and cause the tachometer to change colors in response to changes in engine speed. This could be used to supplement the mechanical section of the tachometer or replace the tachometer. The color may continually change to match the engine speed or the lighting conditions could be stepped or produce other effects at predetermined levels. For example, the tachometer may be lit with one or more LEDs to create the appearance of a white panel until the engine speed reaches a warning level where the lighting conditions would be changed to yellow. Upon further escalation of the engine speed, the lighting conditions may change the tachometer to red and may even flash red on and off if the a particular engine speed is surpassed or maintained for a predetermined period of time. A section of the instrument may also be lit with the LED lighting device. For example, a lighted panel may be provided along with the tachometer and this panel may change in color or respond by producing a predetermined color in concert with the engine speed.

This type of changing illumination to provide information can be used in a variety of areas in the vehicle and to provide information about a variety of performance, ambient, environmental or other conditions. For example, information regarding inside temperature, outside temperature, engine speed, oil pressure, vehicle speed, air quality, system settings, pending collision, traffic density, fuel mileage, remaining fuel, battery status, or for electric vehicles, remaining battery charge, or any other information could be converted to changing illumination conditions. Information regarding network communications could also be displayed. For example, lighting conditions could change indicating new email or an incoming phone call has arrived. The lighting is not limited to the dashboard, although this area may be more visible to a driver, and may provide the driver with easily viewed and interpreted information regarding vehicle performance, system settings and any other useful or required information. Such illumination devices could also be used in heads-up displays to convey information to the windshield or other areas where information is projected. The LED lighting system may be used throughout the vehicle to provide decorative or informative lighting effects.

These lighting systems can also be used with manual switches, sliders, dials or other devices to change the settings manually. The user of the vehicle may want to change the coloring of the interior, exterior or internal space of the vehicle to a particular color or to provide color-changing effects. An example of a decorative color-changing effect is where the color of the light slowly changes similar to a color wheel.

Another useful example of such a lighting device for the vehicle is where it is used for general illumination as well as a decorative display. A cup holder may be lit with such a lighting device. This system may include a fiber optic system for lighting a ring around the cup holder. For example, two or more LEDs may be positioned to couple light into a fiber and the fiber may be positioned around the cup holder. The light would then couple to the fiber and be transmitted through the fiber. The fiber may be frosted, include a pattern, have imperfections or other characteristics such that the light is diverted by the frosting or pattern and projected out of the fiber. Using a frosted fiber can create the illusion that the string is evenly lit. Such devices may also carry information to the user as described above or they may be constant color or manually changing color devices.

Coordinated effects such as chasing rainbows or other effects could be created by networking the lighting devices together. This may be useful in decorating the outside of a vehicle for example. The lower portion of the body of the vehicle could be lit with a plurality of lighting devices and the light could be projected to the ground to create moving color changing effects around the vehicle. See U.S. patent application Ser. No. 09/215,624 "Smart Light Bulb."

Supplementing or replacing the dome lights and task lights in the vehicle with an LED lighting device could also be very useful. The color projected from these lights could then be tunable for various conditions. The lighting device may include a selector for selecting the color red, for example, to provide lighting but avoid eye fatigue and overexposing the eyes to white light while the eyes have become adjusted to the darkened conditions. The lighting could also be set to project a particular color when the car is unlocked or an alarm is disarmed. This could assist the user in finding his vehicle in a crowded parking lot by turning the inside of the vehicle to a flashing blue or changing colors.

It would also be useful to provide a brake lighting system that would have variable brightness corresponding to the brake pedal pressure, deflection or other input. This could be used, for example, to alleviate problems associated with false indications of the driver's intent. With conventional incandescent brake lighting systems a variable brightness system could be employed by varying the voltage supplied to the light fixture in relation to the brake pedal position. A significant problem associated with energizing the incandescent lamps at low power is that they will not warm-up as fast and as a result they will not attain the desired brightness as quickly as desired. This type of control has been impossible to achieve with conventional light emitting diode brake lighting systems because these systems employ simple circuitry to turn the light emitting diodes on or off with no way of varying the light intensity.

A lighting system according to the invention could also be used as a warning system. For example, the brake lighting system of a vehicle could be designed to provide varying effects. A braking system could be made where the light-emitting diode brake light intensity would correspond to the brake pedals deflection or pressure. When the braking rate, peddle pressure or other measure of the drivers intent is measured, a corresponding lighting control signal could be sent to the brake lighting system. For example, the driver may only lightly apply the brakes and the brake lighting system may then light at a reduced level. This would indicate to following cars that the driver is slowing and not coming to an abrupt halt. Another example is where the pressure in the brake fluid lines or the pressure of the brake pads on the brake discs would be used to drive signals to the braking system. The speed of the vehicle or rate at which it is changing speed may also be used to provide signals to the braking system. The lowest light intensity can still be fixed at a level high enough to cause warning. The light emitting diodes generate light almost instantaneously to provide a very fast warning even at the lower intensity level, avoiding the slow turn-on problems associated with the incandescent system.

One such system could comprise a position, pressure, velocity or other transducer on the brake pedal or in the braking system. Other sensors could also be employed to create the necessary signals to indicate the desired lighting changes. For example, when the pedal is depressed, a transducer could output a control signal to be used as an input signal to the microprocessor driving the light emitting diodes. A microprocessor could then create a corresponding PWM signal to energize the light emitting diodes. Other input signals could be generated from devices linked to the vehicle's speed sensing system.

A system according to the principles of the invention can also be used to create other warning signals. For example, when the brake pedal is depressed with great force or speed the brake lights could flash by cycling the light emitting diodes at full brightness in a warning pattern. The light emitting diode system is much better than an incandescent system for this kind of warning signal because of the fast response of the light emitting diodes. Rather than a slow flashing rate, as with incandescent automobile flasher or blinker assemblies, the light emitting diodes can be cycled fast enough to make a strobe effect. These lighting effects can also be combined with other functions in the vehicle such as using them as flashers indicating the vehicle is disabled or stopped. Other switches in the vehicle such as a hazard light switch or a fog light switch could also turn on the light emitting diode lighting fixtures. Another advantage of using a light emitting diode system to provide hazard lighting is the system consumes far less power than an incandescent system. The low power consumption will increase the time the vehicle can operate the warning lights when the only available power is the battery. In a situation where the vehicle is operating in low visibility conditions, a fog light switch could be used to activate a portion of one or more of the light emitting diode fixtures to provide a warning beacon.

The warning system could also use two or more different colored LEDs to provide color-changing effects and or combined lighting effects. For example, the light from two or more different colored LEDs could be used to generate a combined color. This may be useful where specific warnings or information is desired. A portion of the tail light assembly may be changed to produce orange in foggy situations to provide a beacon in the back of the vehicle. The light assembly may change to green to indicate the vehicle is in a particular condition.

A lighting system according to the invention may also be used as a diagnostic tool. The lighting system may be inside of the vehicle, outside of the vehicle, within portions of the vehicle or in another place associated or remotely located from the vehicle. Many of today's vehicles have input and output ports to send and receive information. For example, a mechanic may connect a diagnostic system to a port on the vehicle to receive information concerning the vehicle's operation and the mechanic may also send the vehicle's system information to change, set or reset a parameter. These same or other communication ports could be used to send the lighting system information regarding the operation of the vehicle. A lighting system according to the principles of the invention may be used to receive signals from the vehicle and display a color or lighting effects corresponding to the information in the signals. The signals received from the vehicle may need to be converted into lighting control signals. This conversion could be accomplished, for example, with a processor. The processor may be programmed to receive and interpret the signals and then communicate corresponding is lighting control signals. A useful placement of such a lighting device may be under the hood of the vehicle such that it could be seen when the hood is opened. The color of the lighting device or of the illumination emitting from the illumination device could indicate any faults, maintenance issues or other information. This could also be used to replace or supplement the indicator lights within the vehicle. For example, rather then having multiple lights for indicating faults or other information, a single lighting unit according to the invention could be used. This system could indicate many different faults or information by generating specific colors or color changing effects. For example a panel of sufficient size, for example one inch square, could be backlit with a lighting system according to the principles of the invention. The lighting system could cause the panel to change in color to indicate a particular condition or information. A system according the principles of the invention could also receive signals from outside of the vehicle. For example, the system may receive network signals, transmissions, telecommunication signals, signals from the World Wide Web, local area network, personal area network, or other signals. The panel could then change colors to indicate the source of an incoming phone call, receipt of an email, financial information or any other information.

Another embodiment of the present invention is an information system suitable for an office, workplace, home office, room, dorm room, or similar user environment. The information system may receive data indicative of a variable and the system may convert the information to light indicative of the information. For example, the information system may receive data regarding the net worth of an individual and this value may be converted to a particular color of light depending on the actual value as compared to an average value. If the net worth is above the average value, the color of the light may be green and the higher the value is above the average the more blue the light changes. When the net worth value is lower then the average value, the light may be pink and slowly change to red and end with a flashing red light pattern when the value bottoms out at some predetermined value. The light may not change colors but rather turn on at a particular value. The light may be off until the net worth reaches a predetermined value and then the light may turn on red or generate a flashing pattern. The system may also change colors abruptly by turning one color off and another color on such as when the value is in the red range and then in the green. One skilled in the art would appreciate that there are many other light colors and patterns that could be generated to indicate information regarding received information.

Figure 13:
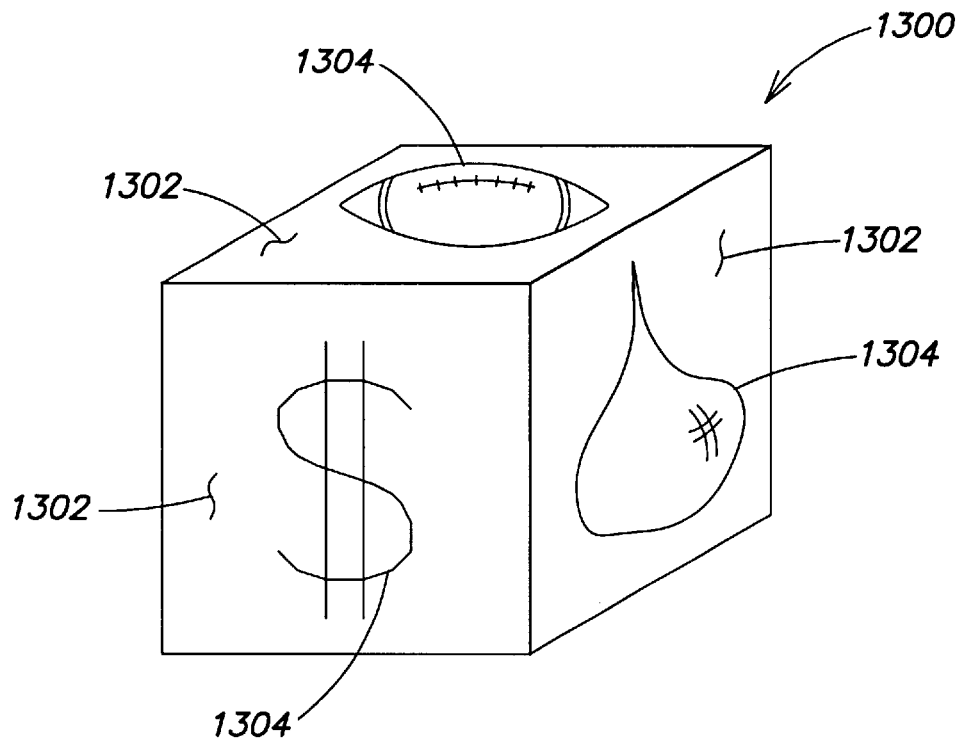
FIG. 13 is an information cube embodiment of an information and illumination system.

FIG. 13 represents an information system according to the principles of the present invention. In this embodiment, a cube 1300 is depicted having sides or side panels 1302. The side may panels include designs, images, logos or the like 1304. The designs 1304 may be removably attachable to the side panels 1302 or they may be permanently affixed or etched into the side panel 1302. The design may also be embedded in the side panel 1302. A system such as that found in FIG. 13 may include a lighting system such that the side panel and or the design can be illuminated.

Figure 14:
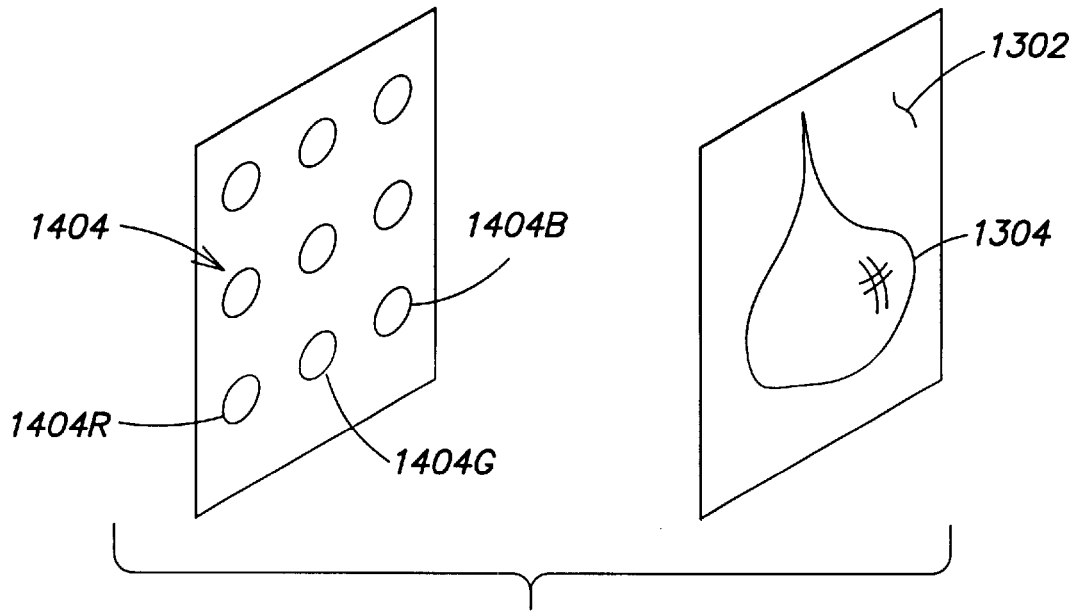
FIG. 14 depicts a panel for conveying information as lit by an array of light emitting diodes.

FIG. 14 represents a lighting system according to the principles of the invention. At least one LED and preferably a group of LEDs 1404 may be used to illuminate the side panel 1302 and or the design 1304. The LEDs 1404 may all be of similar color or they may be of dissimilar color. In a preferred embodiment, the LEDs 1404 may be different colored LEDs 1404R red, 1404G green, and 1404B blue. By using different colored LEDs 1404 many different colors may be generated by combining the light from more than one LED 1404.

In an embodiment, three different colored LEDs 1404R, 1404G, and 1404B may be used to light a design in the side panel. The separate colors may be energized at separate times to generate individual colors of the design or two or more of the colors may be energized simultaneously to generate a combined color for illuminating the design.

Figure 15:
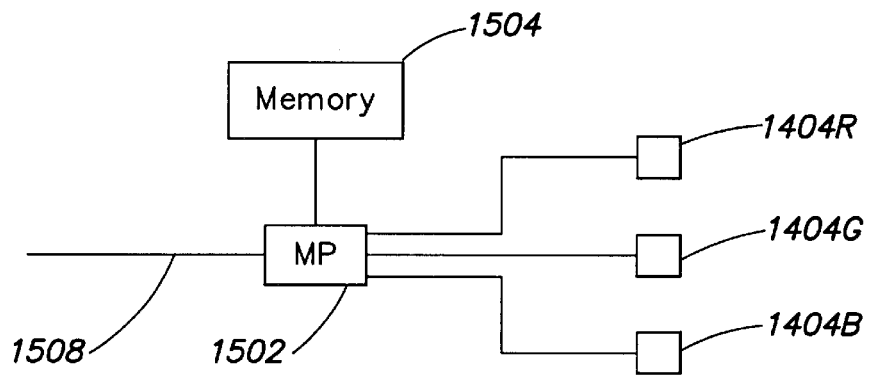
FIG. 15 depicts a schematic diagram of components for providing control to a plurality of light emitting diodes.

Referring to FIG. 15, in a preferred embodiment, the separate LEDs 1404R, 1404G, and 1404B may be controlled through a processor 1502. The processor 1502 may generate pulse width modulated signals or drive the LEDs with analog voltage or other means. Color changing techniques using a single LED or combination of different colored LEDs via a processor are taught in U.S. Pat. No. 6,016,038 which is herby incorporated by reference herein. FIG. 14 illustrates that the LEDs 1404 may be arranged to illuminate the side panel 1302 and or the design 1304. One skilled in the art would appreciate that there are many other configurations where the LEDs 1404 could be used to illuminate the panel 1302.

A block diagram of a lighting system according to the principles of the present invention can be found in FIG. 15. The LEDs 1404 may be individually controlled by a processor 1502. The processor 1502 may be associated with a memory 1504 wherein the memory may include lighting programs or signals that can be associated with received information. In a preferred embodiment, the processor may be a microprocessor, however, it would be appreciated by one skilled in the art that there are many types of processors and processing circuits that could be used. An information signal may be received through data port 1508. The data port 1508 may be a wired or wireless port. The data may contain variable information regarding most any variable. For example, financial information, weather information, sports information, business information, personal information, computer information, performance information, entertainment information, health information, game information, or any other information. An embodiment of an information system, as shown in FIG. 13, may receive a plurality information signals regarding different variables. For example, the system may receive information regarding the weather information, financial information, and the score of a sporting event. The system may then display the information as colored light illuminating a side panel corresponding to the type of information. For example, the sporting event score may be translated into color control signals and the color control signals may be used to control the LEDs 1404 lighting the panel 1302 containing the football shaped design.

In an embodiment, the information system may comprise a cube as illustrated in FIG. 13, pyramid, dodecahedron, sphere, polygon, tetrahedron, cone, rectangular solid, fanciful or other shape. The panels and or designs may be permanently affixed to the information system or they may be removably attached. When they are permanently attached, a processor 1502 may be arranged to communicate particular control signals to a particular set of LEDs. For example, when sports information is received on data port 1508, the processor may direct the control signals to the LEDs that are arranged to illuminate the sports panel. One method of accomplishing this directing of information may be to receive different types of information signals through input port 1508, each type of information containing an identifier identifying the information type. The information may contain a header for example. When the information system receives the information signal the processor may retrieve control signals from memory 1504 corresponding to the particular type of information and the communicate control signals to the LEDs in the appropriate panel. When the panels or designs are removably attached, the panels and or designs may include a feature that indicates its form and the feature may be received by the processor to identify the particular panel with a type of information.

Figure 16:
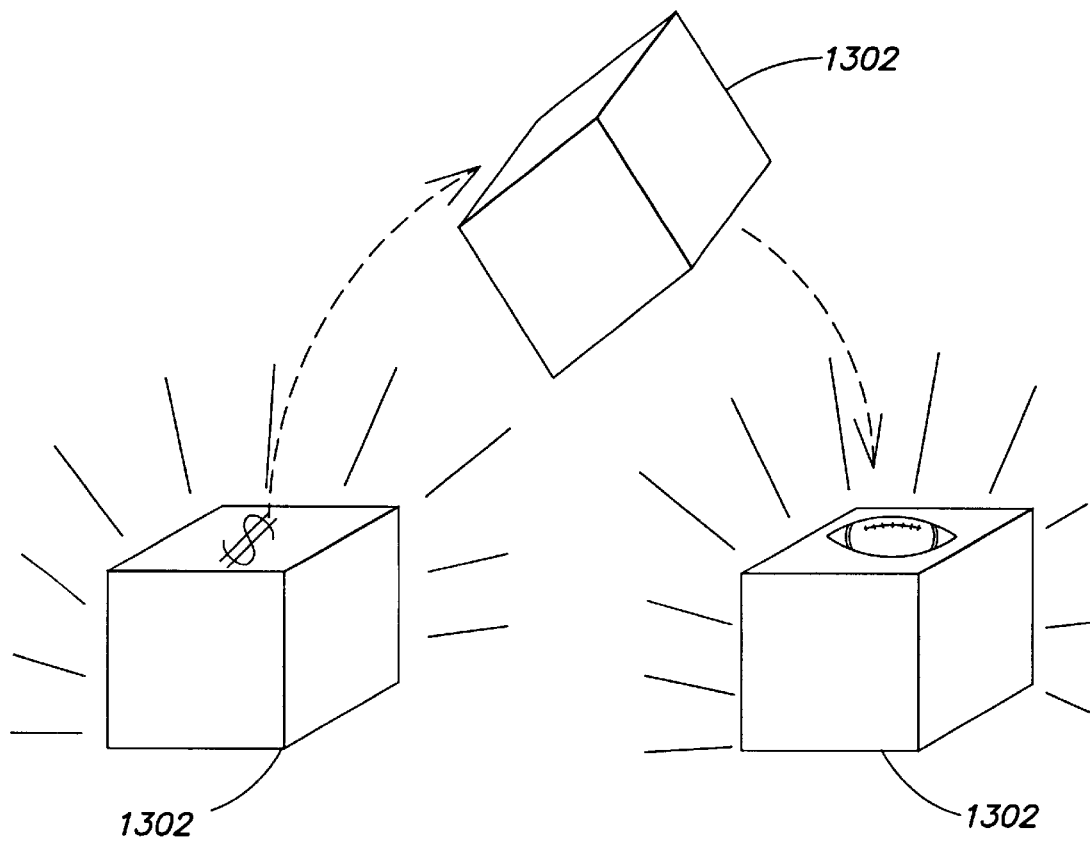
FIG. 16 depicts an embodiment of an information cube with a variety of operational modes.

In an embodiment, the information system may be a cube or other shape and the entire or substantial portion of the cube may be illuminated. The panels 1302 may be associated with particular information sources but the entire cube may appear to be illuminated. Changing the orientation of the cube as illustrated in FIG. 16, for example, may change the source of the information or the information display. The cube may contain a position-oriented switch or device such that the position of the switch determines which source of information will be displayed. For example the switch may a gravity-activated switch or a position activated switch where a metal ball moves through a pathway to make contact with one of a plurality of connectors or any other position switch. In an embodiment, the information system may receive different types of information through a communication port 1508 and the information system may select the information to display through the switch position. In an embodiment, the information system may receive only one type of information and the source or type of information may be determined by the switch position. The switch position may also be communicated to an information source to initiate communication of an information signal.

Figure 17:
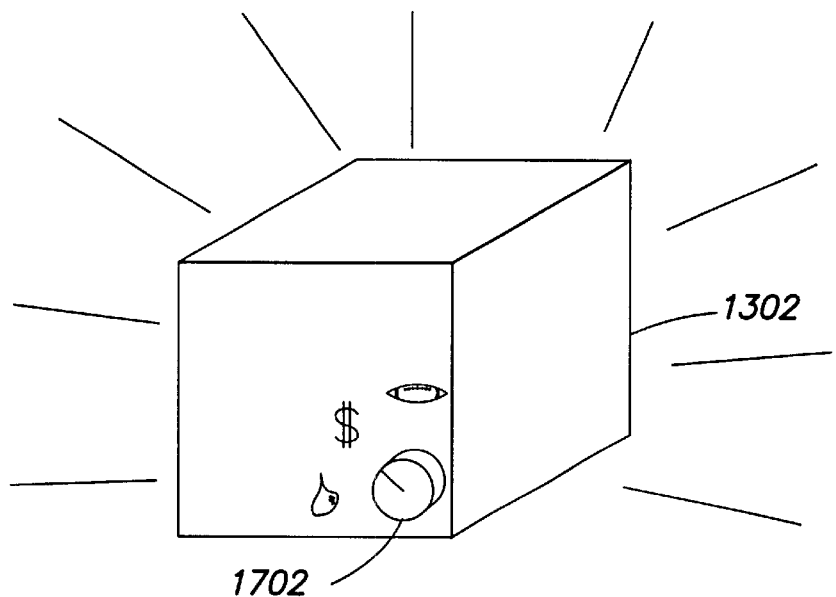
FIG. 17 depicts an alternate embodiment of a cube of FIG. 16.
Figure 18:
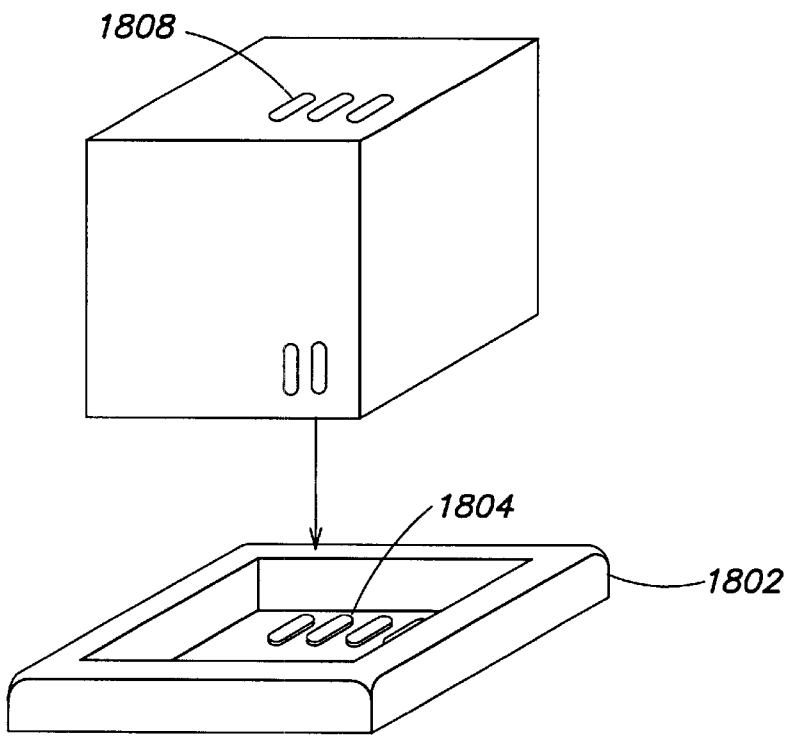
FIG. 18 depicts an embodiment of an information and illumination system with manual inputs.

FIG. 17 illustrates an embodiment of the invention where a user interface 1702 is used to determine the type of information to be displayed by the information system. The user interface may be a switch, dial, slider or any other type of interface. The user interface may be a wired or wireless device. FIG. 18 illustrates yet another embodiment of the present invention where the selection of the type of information to be displayed is generated through the position of the device within a cradle or base. A cube may be associated with features 1808, for example, and the base 1802 may be associated with receiving features 1804. The patterns or other identifiers of the features may determine which information is to be displayed.

Figure 19:
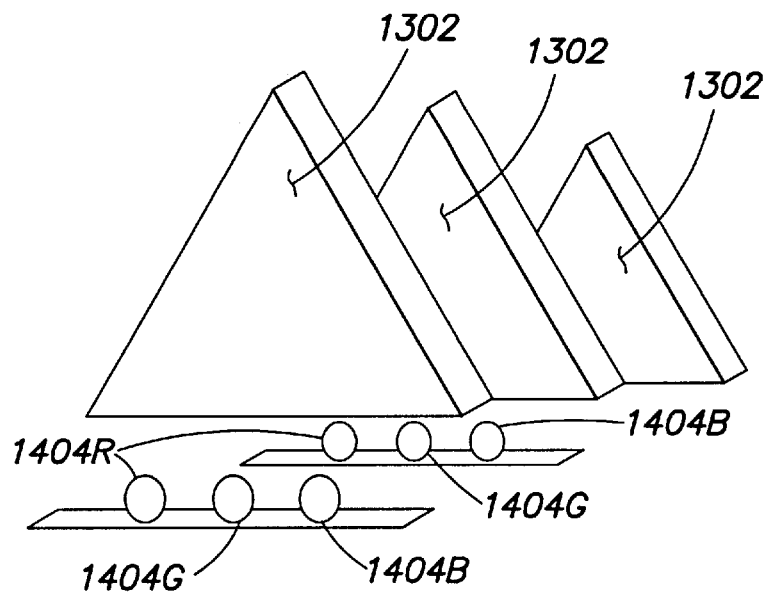
FIG. 19 depicts an embodiment of an information and illumination system.

FIG. 19 illustrates another information system according to the principles of the present invention. The panels 1302 in this embodiment are triangular and positioned to is overlap one another. The panels 1302 may be edge lit, that is, the LEDs 1404 may be arranged to light the panels by injecting light through one or more of the panel edges. Each panel 1302 may be lit with a different LED 1404 or set of LEDs 1404 such that each panel may be independently illuminated.

The present invention has been described through several illustrative embodiments and these embodiments should not be used to limit the invention. For example, while many of the embodiments described herein indicate the processor and memory reside within a housing wherein the LEDs are also located, these elements may reside remote from the illumination device. A second processor may used to communicate information signals to the illumination system or a second processor may be used to communicate control signals to the LEDs. A computer for example may retrieve information from the World Wide Web and communicate scalar information to the information system. The computer may also be used to generate control signals to be communicated to an illumination or information system.

Another embodiment of the present invention provides illumination for backlighting of display screens, such as liquid crystal display panels. With the advent of high brightness LEDs, general illumination and illumination of objects with LEDs has become a viable, efficient, economic and long life solution in many applications. U.S. Pat. No. 6,016,038 describes many methods and uses for LED display lighting and illumination control. This technology has also enabled the edge, back, surface and through lighting of materials with LEDs to produce bright illumination effects of objects. The effects can be used for lighting an object with a solid color, changing the light intensity of the object, changing the objects color or the effects can take on a dynamic form of color effects or coordinated color effects by and between separate objects.

An object can be lit with one or more LEDs to provide illumination. Where one LED is used, the object may be lit with a single color with varying intensity or the intensity may be fixed. In a preferred embodiment, the object being lit includes more than one LED and the LEDs are different colors. As discussed above, in a preferred embodiment, the LED control signals would be PWM signals generated by a microprocessor using three LED channels with at least one LED per channel to generate 16.7 million colors. This technique is described in U.S. Pat. No. 6,016,038.

In an embodiment, disclosed herein is a monochrome-image LCD screen with a color changing backlighting system. The back lighting system could be used for illumination, increased contrast, providing information, ornamental purposes or any other reason. It would also be useful to provide an LCD display with low cost and high-energy efficiency, along with the benefit of changing the color of the device.

Figure 20:
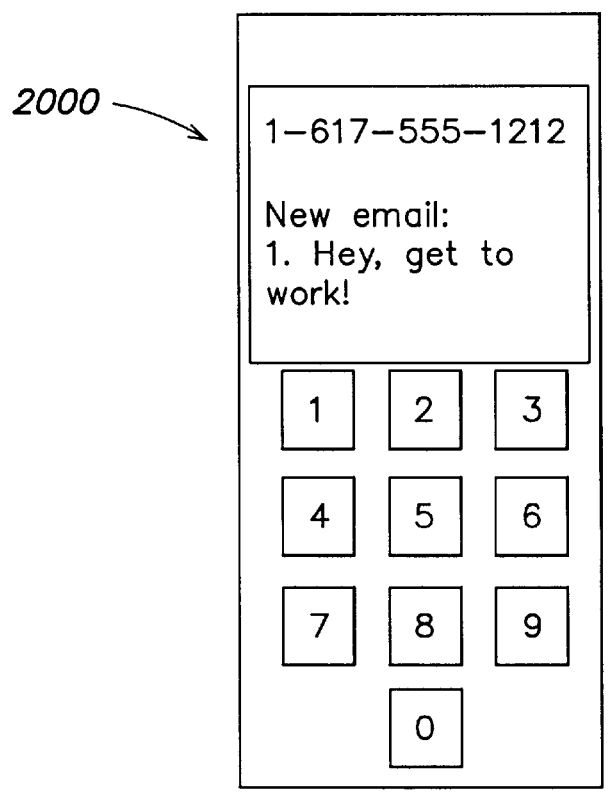
FIG. 20 depicts a handheld device with a backlit LCD display.
Figure 21:
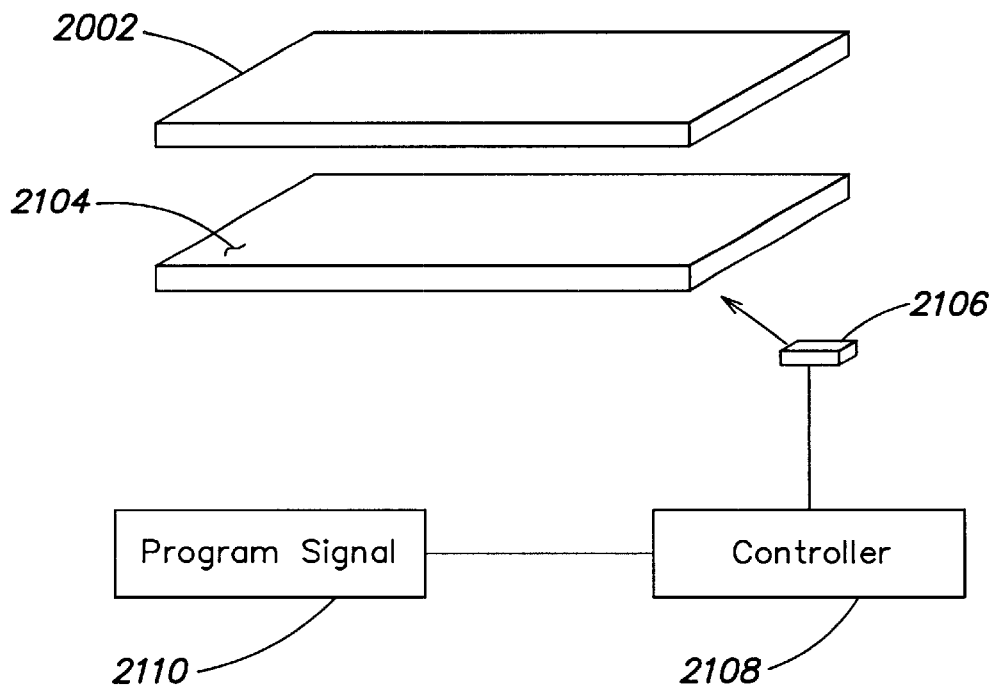
FIG. 21 depicts components for a backlit LCD display embodiment of an illumination and information system.

Referring to FIG. 20, to provide a color changing back lighting system, two or more different colored LEDs may be provided. The LEDs may be directed to illuminate the LCD screen 2002 from behind such that the energized liquid-crystals block a portion of the light. As illustrated in FIG. 21, the LEDs 2106 may be arranged to light a second surface 2104 such that the second surface appears evenly illuminated. This second surface 2104 may be positioned behind the LCD screen 2002 to provide a surface of backlighting. The second surface 2104 may be lit using backlighting, edge lighting, surface lighting, through lighting or other lighting method.

In an embodiment, a controller 2108 is provided to control the LEDs and the controller 2108 is associated with a program signal input 2110. A program signal may be communicated to the program signal input. The program signal may contain information for the lighting system. The signal may be in a digital or analog format. If the signal is in an analog format, an A/D converter may be provided to convert the signal to digital. Upon receipt of a digital signal, the controller can initiate control signals to the LEDs. In a preferred embodiment, the control signals are pulse width modulated signals that correspond to the program signal. For example, the system may be provided with a memory for storing lighting control signals and the memory may be associated with the controller. The stored programs may represent particular program signals such as a particular color, color changing effect or other lighting condition. A program signal may be received indicating that the user has selected the color blue as a background and the controller would activate the blue control signals to change the backlighting to a blue condition.

The system may include a user selector such as a button, dial, selector switch or other selector for initiating the desired program signals. For example, the system may have a button for stepping through several programs. Program names may be illustrated on the LCD screen or they may be indicated elsewhere. In many applications, the LCD screen is part of another device that has buttons, screen activated selection or other selector mechanisms. These selector mechanisms can also be used to provide the program signals to the back lighting system. In other devices the LCD screen is separate from the device sending the program signals and the program signals may be sent through electromagnetic transmission, RF transmission, IR transmission, microwave transmission, acoustic transmission, wire, cable, network or any other communications method.

In a preferred embodiment, the color changing back lighting system is part of an LCD screen in a telephone. Many telephones include an LCD screen as a portion of the user interface. As described hereinabove, these LCD screens are generally monochromatic with single colored backlighting systems. With this invention, the backlighting system could be used to provide pleasing color changing effects or to provide information. The telephone could be a telephone, phone, cellular phone, communication device, digital phone, analog phone, satellite phone, or any other type of telephone. The controller may have a program signal input and the program signal may be provided through a button or other user interface. The program signal may also be communicated to the phone through the phones normal communications method. This transmission may be a microwave transmission for a cellular phone or wire transmission for a land based phone or other communication transmission method. The program signal could also be a separate transmission. The transmission may include information about an incoming calls origin (caller id) as well as other information. The backlighting of the LCD screen could change colors to correspond to the caller id information or other information received. For example, the backlighting system may be associated with memory and the memory may be programmed with several lighting control programs. One of the lighting control programs may be to change the backlighting system red and another program to change the lighting to green. The user may load caller id information into the phone such that when a particular call is received the phone screen should turn red, indicating the user should not answer the phone. This provides a very fast and effective method of alerting the user of the caller id without having to read the information on the screen. The screen could also change to green when the incoming call is from a person the user has identified to provide information that the user wants to answer the phone. A particular number may also be programmed to provide color-changing effects such as quickly changing the screens color from blue to red covering all of the colors in between.

The program input could also be associated with a sensor. The sensor could provide a signal indicative of temperature or other condition and this information could be translated to a color or color changing effect in the LCD screen. If the sensor provides an analog voltage signal, an analog to digital converter could be provided to change the signal to a digital signal.

Figure 22:
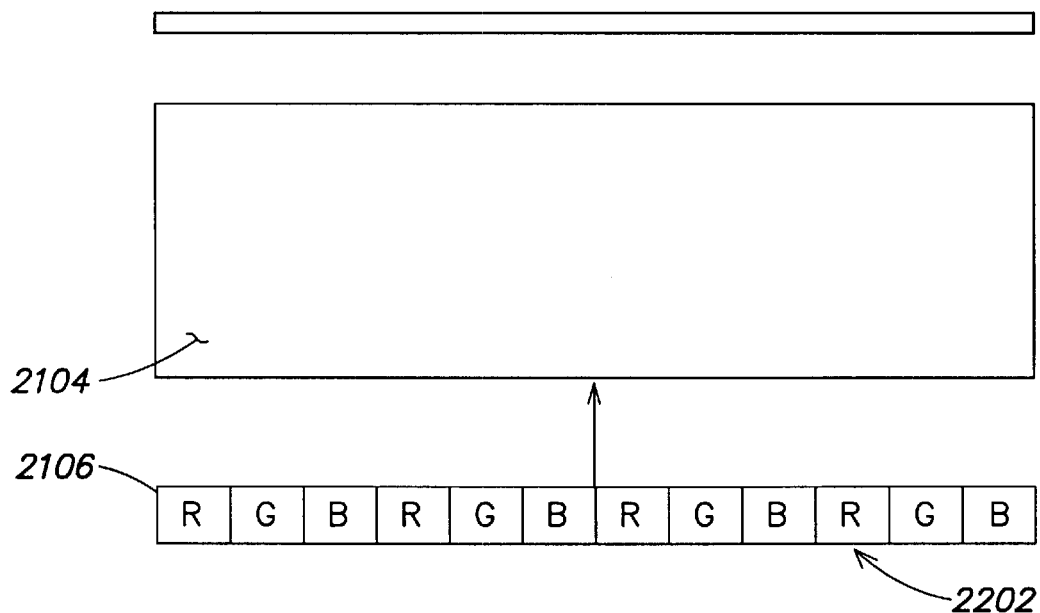
FIG. 22 depicts components for a backlit LCD display embodiment of an illumination and information system.

FIG. 22 illustrates an LED array 2202 that may be used to edge light a back lighting panel. The LEDs 2106 may be arranged in an alternating fashion such as red, green, and then blue or any other arrangement to provide color mixing of the projected light. This array may be attached to one edge of the back lighting panel and a mirror or other reflective surface may be located on the opposite surface. One or more LED arrays may be used on any given backlighting surface.

The caller id system could also be separate from a phone and could be a standalone device. The caller id system could be a lighted object or material and is not limited to an LCD screen. For example, two or more different colored LEDs could be provided to light a material, translucent material, semi-translucent material or any other material that will provide illumination or display of the colored light. The system could include a controller for controlling the LEDs as well as a program signal input for receiving information. The information received could include information regarding the origin of the caller and this information could be used to change the color of the device. This type of lighting device could be used as a decorative lamp as well as an information system. The lamp may be table mounted, ceiling mounted, floor mounted, wall mounted, a hand held device, a portable device or any other configuration. The system may be used for general illumination and then the lamp may change colors to indicate the origin of the call.

The information received by the LCD backlighting system could be any kind of information. In a preferred embodiment, the information may be converted into corresponding lighting control signals to provide information through a colored or color changing LCD screen. This could be used to display information regarding financial information, environmental information, status, timing, battery power, or any other information. See related Provisional Applications from Color Kinetics, "Information System," "Intelligent Indicators," "Color Changing LCD Screens" and "LED Based Lighting Systems and Methods for Vehicles." One example of using the backlighting system as a source of information is when the user wants to monitor the value of a company's stock. Information regarding the stock price could be received by a cellular telephone that is equipped with a color changing backlighting system. This information could then be converted into lighting control signals to change the color of the backlighting system. The LCD screen may begin to flash green when the stock price has reached a predetermined high value or change to cyan when the volume is high. The screen could also slowly or quickly change colors to indicate the close of the stock exchange. These effects could be programmed into the lighting system such that when information is received the lighting system activates the corresponding lighting control signals from memory. The system could also be arranged to receive information in the form of lighting control signals to be sent to the LEDs for lighting control. Another method would be to receive signals that include lighting control information. This information could be decoded such that the lighting control information is communicated to the lighting system and the other information is communicated to another device.

The color changing LCD screen could be used to supplement or replace other information systems. For example, when the telephone rings the colored screen may change colors or flash different colors to indicate an incoming call. The ringer and vibrating system may also be deactivated to allow a visual indication of the call. Another example of a useful color changing display is when the color changing display is used in conjunction with a gaming system. The backlighting system may change color in response to a received signal. The backlighting may also change colors to indicate that a certain level in the game has been reached or that there is a dangerous predator lurking nearby. This provides the user with another level of interaction to increase the pleasure derived from the gaming experience. A popular version of a hand-held gaming system is the Gameboy. This game includes a monochrome-image LCD and could be provided with a color changing back lighting system. The software that runs during the game could be programmed to change the color of the backlighting to suit particular situations in the game. Also see attorney docket number CKC-30.60 "Digital Entertainment II." and attorney docket number CKC-12.06 "Lighting Entertainment System."

As would be obvious to a person skilled in the art, the color changing backlighting system could be used wherever an LCD screen is useful including in a telephone, phone, cellular phone, digital phone, analog phone, communication device, gaming device, portable gaming device, personal digital assistant, pager, calculator, portable device, computer, information device, information screen, display screen, MP3 player, music player, CD player, DVD player, or other device.

Figure 23:
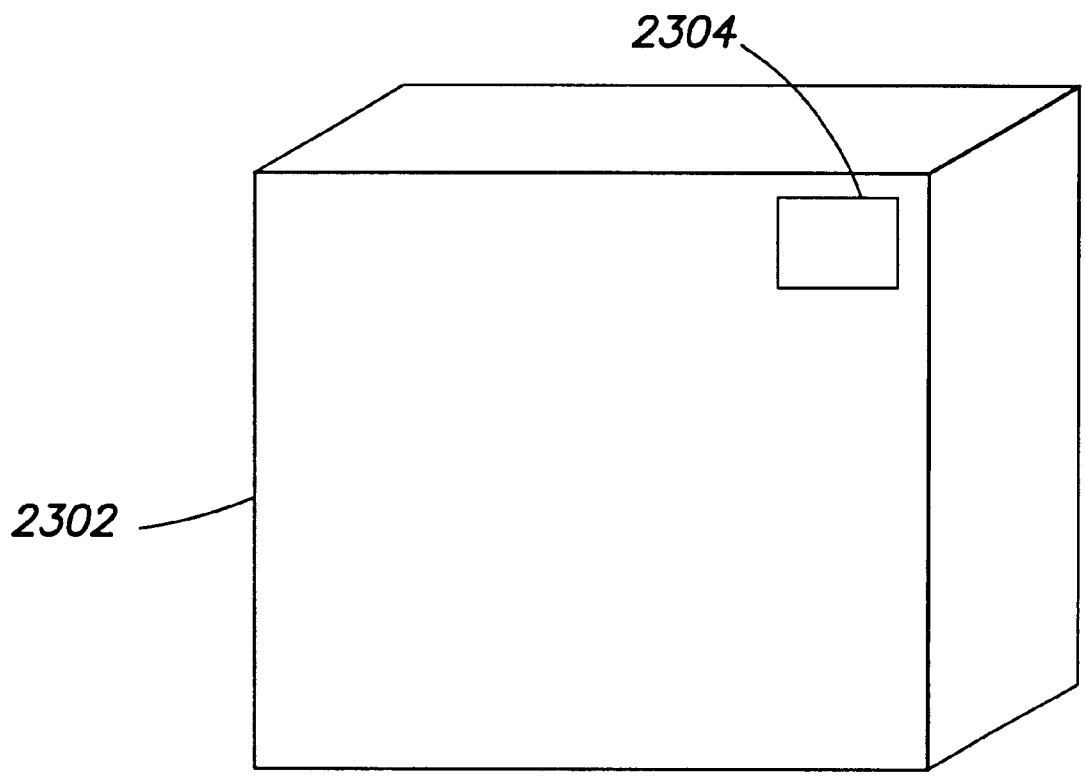
FIG. 23 depicts a package indicator embodiment of an illumination and information system.

Another embodiment disclosed herein is an information and illumination system that serves as an indicator of a condition of a package, container or similar item. FIG. 23 illustrates a package 2302 with an intelligent package indicator 2304. The package indicator 2304 could be attached to any object including, but not limited to, a package, box, containers, containers for perishables, containers for blood, containers for body parts, clothing, food, automobile, telephone, computer, goods, apparel or any other object. The indicator 2304 could include two or more LEDs with a processor. The processor could control the LEDs through a pulse width modulated signal (PWM), through analog voltage control, through a resistor ladder, or any other control technique. When combinations of LEDs of two or more different colors are used, the illumination from each LED can mix with the others to project a combined color. As discussed above, in a preferred embodiment, control circuitry using PWM signals generated by a microprocessor using three LED channels with at least one LED per channel can generate 16.7 million colors.

Figure 24:
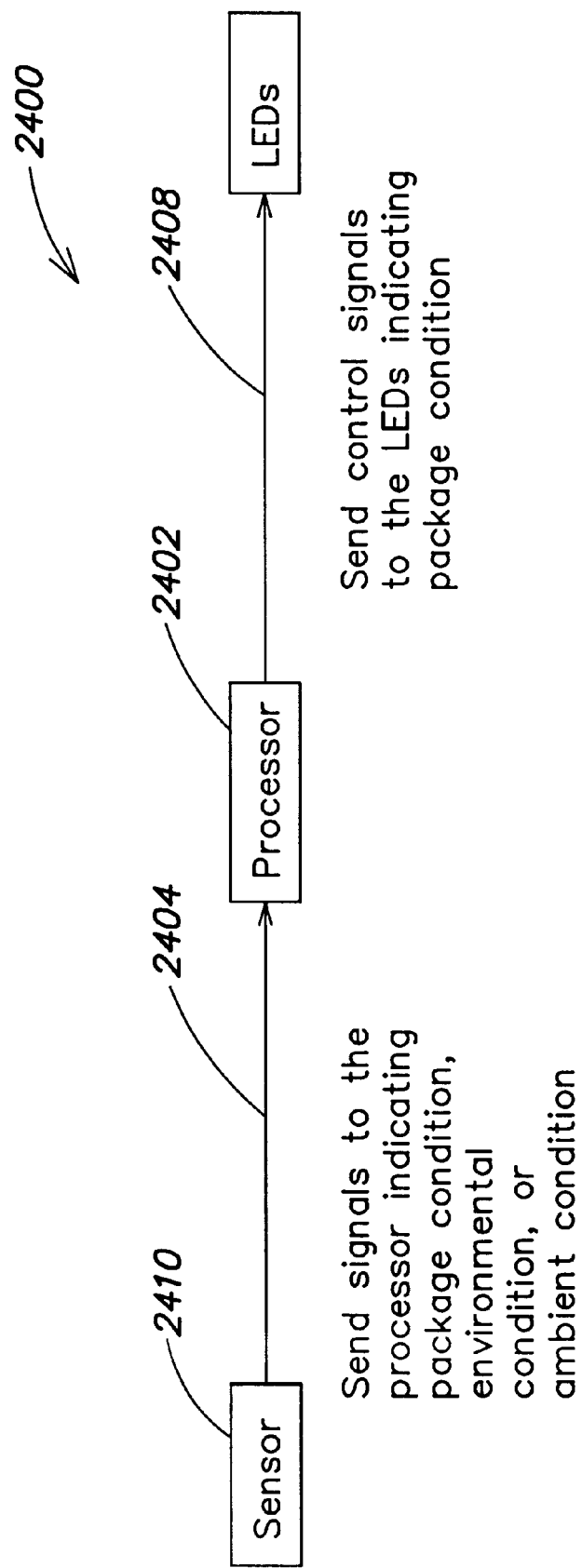
FIG. 24 depicts a flow diagram for an illumination and information system.

Referring to FIG. 24, in a preferred embodiment, a flow diagram 2400 demonstrates the flow of steps by which a processor 2402 of the indicator would be capable of receiving program signals at a step 2404 to change the color of the indicator at a step 2408. The program signals may come from a timing circuit, sensor, transducer, or any other device for generating program signals. In an embodiment, the input comes from a sensor 2410. The program signals may represent conditions such as, but not limited to, temperature, time, humidity, shock, vibration, noise, electrical signals, or electromagnetic signals. For example, a package may have a shelf life of three days so the package indicator may be equipped with a timing device to monitor the time the product sits on a shelf or is in transit. As the time period elapses, the color of the indicator may change. The indicator may be green during the first twelve hours and it may gradually change to red by the end of the third day indicating the package contents may be spoiled. The indicator can intermittently light to conserve battery power. For example, the indicator may flash the color for a period of 0.1 seconds every five seconds. The indicator may also be equipped with a button or other switch to put it into a continuously lit mode or other mode for ease of identification. The customer may use this feature to better identify the color. Another example where the package indicator would be useful is where the package contents are not permitted to be exposed to elevated or lower temperatures. A temperature-sensing device could be associated with the indicator and the indicator could change its color depending on the temperature conditions during shipping. This could also be useful for shipments of perishable goods. The processor may further process and interpret temperature data provided by a temperature sensor. For example, the processor may generate an 'okay' color, such as green, when no temperature conditions have been violated, and may generate a 'not okay' color, such as red, when one or more temperature conditions have been violated. Temperature conditions may include a maximum temperature, as well as a maximum time-temperature determined through integration of temperature measurements over time. For cold-sensitive materials, the processor may integrate all temperature measurements below some predetermined minimum. Integrated temperature measurements may or may not be additive, as in summing two different periods of elevated temperature, depending on the sensitivity of package contents to temperature variations. FIG. 24 illustrates a block diagram of how the package indicator may operate.

Different environmental conditions may be tracked together. For example, an elevated temperature may only be relevant, or may be weighted differently, depending on a concurrent humidity measurement. Air pressure may also be tracked, as where packages are shipped via air freight. The processor may monitor for any combination and duration of environmental conditions for sensors providing data to the processor.

The indicator may include a sensor for receiving external signals. The receiver may receive signals such as, but not limited to, electromagnetic, RF, IR, microwave, cable, wire, network or any other signals. The package or the device being shipped may include a transmitter to transmit signals indicative of environmental conditions. Other devices may also have transmitters for transmitting signals to the indicator device. For example, the contents of a package may be equipped with a transmitter. This transmitter may send signals to the indicator to indicate the condition of the package. In another application, an external transmitter may send signals to the indicator to change the indicators program or to begin a retrieval process of stored information.

The indicator may be provided with memory to store information regarding shipping events or other events of interest. For example, temperature data may be stored indicating the temperature in thirty-minute intervals since the package left the hands of the shipper. This information could later be retrieved to provide evidence of storage conditions.

There is also provided a method of maintaining warehouse inventory using intelligent package indicators. The indicators can be aligned on the packages in a warehouse such that the warehouse manager can visually inspect the indicators. With a very quick scan of the inventory on the shelf the manager may be able to tell which inventory is fresh and which inventory needs to be processed quickly to prevent spoilage. The indicators can also include infrared LEDs to allow for stealth monitoring of the packages. This may be useful to prevent a customer from drawing conclusions based upon visual indicators. The infrared signals could be viewable through an IR reading optical device or any other device used for viewing IR signals. The IR signals could also be transmitted as data to be received by another device. This would allow the indicator to communicate with another device such as, but not limited to, a handheld device.

The device may also have an interface for resetting the indicator when the product is placed for retail sale. A button, or other interface device, may be used to set the indicator into customer mode. This may allow for certain shipping parameters to be met and then, once shipping is complete, allow for reset of the indicator into a customer mode where a retail clock is started.

The device may be realized using a single LED for indicating the condition of the package. In this example, red may mean that a package is not okay and green may mean that package is okay. Additional LEDs may be used to indicate other conditions. For example, a yellow LED may be provided to indicate that some specified environmental conditions have been marginally exceeded. A row of LEDs may be provided to indicate time left before expiration of a packaged good. The processor may also provide binary coded decimal or alphanumeric LED display driver output to display a number. The number may be indicative of, for example, a quality level (such as between 0 and 100), a time to expiration in weeks or days, or an expiration date that is based upon some combination of time and other environmental conditions.

While the invention has been disclosed in connection with the embodiments shown and described in detail, various equivalents, modifications, and improvements will be apparent to one of ordinary skill in the art from the above description. Such equivalents, modifications, and improvements are intended to be encompassed by the claims set forth hereinafter.

- 48 -

APPENDIX A

```
/*
    DMXPlayerFrame.java

File:           DMXPlayer
    Author:         ochemel
    Description:    This application reads data from a text file and writes it to a DMX channel...
*/ import java.awt.*;
import java.awt.event.*;
import javax.swing.*;
import java.util.*;
import java.io.*;
import com.colorkinetics.control.dmx.*;

public class DMXPlayerFrame extends JFrame
{

// IMPORTANT: Source code between BEGIN/END comment pair will be regenerated
// every time the form is saved. All manual changes will be overwritten.
// BEGIN GENERATED CODE
    // member declarations
    javax.swing.JButton loadFileButton = new javax.swing.JButton();
    javax.swing.JLabel fileNameStatic = new javax.swing.JLabel();
    javax.swing.JLabel numEntriesStatic = new javax.swing.JLabel();
    javax.swing.JLabel minStatic = new javax.swing.JLabel();
    javax.swing.JLabel maximumStatic = new javax.swing.JLabel();
    javax.swing.JLabel delayStatic = new javax.swing.JLabel();
    javax.swing.JLabel fileNameLabel = new javax.swing.JLabel();
    javax.swing.JLabel numEntriesLabel = new javax.swing.JLabel();
    javax.swing.JLabel minLabel = new javax.swing.JLabel();
    javax.swing.JLabel maxLabel = new javax.swing.JLabel();
    javax.swing.JButton startButton = new javax.swing.JButton();
    javax.swing.JButton stopButton = new javax.swing.JButton();
    javax.swing.JButton exitButton = new javax.swing.JButton();
    javax.swing.JButton initButton = new javax.swing.JButton();
// END GENERATED CODE
    IntegerInput delayInput = new IntegerInput(100,6,0,1000000);

LinkedList dataList = new LinkedList();
    int dataCount = 0;
    Double dataMax = new Double(0.0);
    Double dataMin = new Double(0.0);

Runnable playerThread;
    Thread th;

private DMXUniverse DMX;
    private String[] interNames;
    private int selectedInterface = -1;

public DMXPlayerFrame()
    {
        DMX = new DMXUniverse("DMXPlayer");
    } public void initComponents() throws Exception
    {
// IMPORTANT: Source code between BEGIN/END comment pair will be regenerated
// every time the form is saved. All manual changes will be overwritten.
// BEGIN GENERATED CODE
        // the following code sets the frame's initial state
        loadFileButton.setSize(new java.awt.Dimension(110, 30));
        loadFileButton.setVisible(true);
        loadFileButton.setText("Load File...");
        loadFileButton.setLocation(new java.awt.Point(110, 70));

fileNameStatic.setSize(new java.awt.Dimension(120, 20));
        fileNameStatic.setVisible(true);
        fileNameStatic.setText("File Name:");
        fileNameStatic.setLocation(new java.awt.Point(30, 150));

numEntriesStatic.setSize(new java.awt.Dimension(120, 20));
```

- 49 -

```
numEntriesStatic.setVisible(true);
numEntriesStatic.setText("Number of Entries:");
numEntriesStatic.setLocation(new java.awt.Point(30, 190));

minStatic.setSize(new java.awt.Dimension(120, 20));
minStatic.setVisible(true);
minStatic.setText("Minimum:");
minStatic.setLocation(new java.awt.Point(30, 220));

maximumStatic.setSize(new java.awt.Dimension(120, 20));
maximumStatic.setVisible(true);
maximumStatic.setText("Maximum:");
maximumStatic.setLocation(new java.awt.Point(30, 250));

delayStatic.setSize(new java.awt.Dimension(120, 20));
delayStatic.setVisible(true);
delayStatic.setText("Delay(ms):");
delayStatic.setLocation(new java.awt.Point(30, 300));

fileNameLabel.setSize(new java.awt.Dimension(180, 20));
fileNameLabel.setVisible(true);
fileNameLabel.setText("None Selected");
fileNameLabel.setLocation(new java.awt.Point(150, 150));

numEntriesLabel.setSize(new java.awt.Dimension(180, 20));
numEntriesLabel.setVisible(true);
numEntriesLabel.setText("-");
numEntriesLabel.setLocation(new java.awt.Point(150, 190));

minLabel.setSize(new java.awt.Dimension(180, 20));
minLabel.setVisible(true);
minLabel.setText("-");
minLabel.setLocation(new java.awt.Point(150, 220));

maxLabel.setSize(new java.awt.Dimension(180, 20));
maxLabel.setVisible(true);
maxLabel.setText("-");
maxLabel.setLocation(new java.awt.Point(150, 250));

startButton.setSize(new java.awt.Dimension(90, 30));
startButton.setVisible(true);
startButton.setText("Start");
startButton.setLocation(new java.awt.Point(20, 380));

stopButton.setSize(new java.awt.Dimension(90, 30));
stopButton.setVisible(true);
stopButton.setText("Stop");
stopButton.setLocation(new java.awt.Point(120, 380));

exitButton.setSize(new java.awt.Dimension(90, 30));
exitButton.setVisible(true);
exitButton.setText("Exit");
exitButton.setLocation(new java.awt.Point(240, 380));

initButton.setSize(new java.awt.Dimension(110, 30));
initButton.setVisible(true);
initButton.setText("Initialize...");
initButton.setLocation(new java.awt.Point(110, 20));

setSize(new java.awt.Dimension(353, 451));
getContentPane().setLayout(null);
setTitle("DMXPlayer");
setLocation(new java.awt.Point(0, 0));
getContentPane().add(loadFileButton);
getContentPane().add(fileNameStatic);
getContentPane().add(numEntriesStatic);
getContentPane().add(minStatic);
getContentPane().add(maximumStatic);
getContentPane().add(delayStatic);
getContentPane().add(fileNameLabel);
getContentPane().add(numEntriesLabel);
getContentPane().add(minLabel);
getContentPane().add(maxLabel);
getContentPane().add(startButton);
```

- 50 -

```
    getContentPane().add(stopButton);
    getContentPane().add(exitButton);
    getContentPane().add(initButton);

loadFileButton.addActionListener(new java.awt.event.ActionListener() {
        public void actionPerformed(java.awt.event.ActionEvent e) {
            loadFileButtonActionPerformed(e);
        }
    });
    startButton.addActionListener(new java.awt.event.ActionListener() {
        public void actionPerformed(java.awt.event.ActionEvent e) {
            startButtonActionPerformed(e);
        }
    });
    stopButton.addActionListener(new java.awt.event.ActionListener() {
        public void actionPerformed(java.awt.event.ActionEvent e) {
            stopButtonActionPerformed(e);
        }
    });
    exitButton.addActionListener(new java.awt.event.ActionListener() {
        public void actionPerformed(java.awt.event.ActionEvent e) {
            exitButtonActionPerformed(e);
        }
    });
    initButton.addActionListener(new java.awt.event.ActionListener() {
        public void actionPerformed(java.awt.event.ActionEvent e) {
            initButtonActionPerformed(e);
        }
    });
    addWindowListener(new java.awt.event.WindowAdapter() {
        public void windowClosing(java.awt.event.WindowEvent e) {
            thisWindowClosing(e);
        }
    });
// END GENERATED CODE
    delayInput.setSize(new java.awt.Dimension(90, 30));
    delayInput.setVisible(true);
    delayInput.setLocation(new java.awt.Point(250, 200));
    getContentPane().add(delayInput);
} private boolean mShown = false;

public void addNotify()
{
    super.addNotify();

if (mShown)
        return;

// resize frame to account for menubar
    JMenuBar jMenuBar = getJMenuBar();
    if (jMenuBar != null) {
        int jMenuBarHeight = jMenuBar.getPreferredSize().height;
        Dimension dimension = getSize();
        dimension.height += jMenuBarHeight;
        setSize(dimension);
    } mShown = true;
}

// Close the window when the close box is clicked
void thisWindowClosing(java.awt.event.WindowEvent e)
{
    setVisible(false);
    dispose();
    System.exit(0);
} public void exitButtonActionPerformed(java.awt.event.ActionEvent e)
{
```

```
        setVisible(false);
        dispose();
        System.exit(0);
    } public void startButtonActionPerformed(java.awt.event.ActionEvent e)
    {
        ((DMXPlayerThread)playerThread).delay = delayInput.getValue();
        ((DMXPlayerThread)playerThread).shouldRun = true;
//      th.setPriority(th.MAX_PRIORITY);
    } public void stopButtonActionPerformed(java.awt.event.ActionEvent e)
    {
        ((DMXPlayerThread)playerThread).shouldRun = false;
//      th.setPriority(th.MIN_PRIORITY);
    } public void loadFileButtonActionPerformed(java.awt.event.ActionEvent e)
    {
        FileDialog d = new FileDialog(this, "Load data file", FileDialog.LOAD);
        d.show();

String fileName = d.getFile();
        String dirName = d.getDirectory();

if(fileName != null) {
            try {
                fileNameLabel.setText(fileName);
                File f = new File(dirName, fileName);
                FileReader fr = new FileReader(f);

int size = (int)f.length();
                char[] data = new char[size];
                int chars_read = 0;

while(chars_read < size)
                    chars_read += fr.read(data, chars_read, size - chars_read);

fr.close();

String s = new String(data);

StringTokenizer st = new StringTokenizer(s);

String t = new String();
                while(st.hasMoreTokens()) {
                    t = st.nextToken();
                    try {
                        Double val = new Double(t);
                        dataList.add(val);
                    } catch (NumberFormatException nfe) {}
                }
            } catch (IOException ioe) {
                JOptionPane errorDialog = new JOptionPane();
                errorDialog.showMessageDialog(null, "Caught an IOException in LoadFileActionPerformed.");
            } dataCount = dataList.size();
            numEntriesLabel.setText(String.valueOf(dataCount));

if(dataCount > 0) {
                Double D = (Double)dataList.get(0);
                dataMax = D;
                dataMin = D;
                for(int i = 1; i < dataCount; i++) {
                    D = (Double)dataList.get(i);
                    Double newMax = new Double(Math.max(dataMax.doubleValue(), D.doubleValue()));
                    dataMax = newMax;
                    Double newMin = new Double(Math.min(dataMin.doubleValue(), D.doubleValue()));
                    dataMin = newMin;
                }
            }
        }
```

- 52 -

```java
        maxLabel.setText(String.valueOf(dataMax));
        minLabel.setText(String.valueOf(dataMin));
    }
    playerThread = new DMXPlayerThread(delayInput.getValue(), dataList, dataMin, dataMax, DMX);
    th = new Thread(playerThread);
    th.setPriority(th.MIN_PRIORITY);
    th.start();
} public void initButtonActionPerformed(java.awt.event.ActionEvent e)
{
    if (DMXUniverse.isAvailable()) {
        interNames = DMXUniverse.getInterfaceNames();
        String reply = (String)JOptionPane.showInputDialog(
            this,
            "Select a DMX interface:",
            "Select",
            JOptionPane.QUESTION_MESSAGE,
            null,
            interNames,
            interNames[0]);

if (reply == null) return;

selectedInterface = -1;
        for (int i = 0; i < interNames.length; i++) {
            if (reply == interNames[i]) {
                selectedInterface = i;
                break;
            }
        } try {
            DMX.close();
            DMX.selectInterfaceFromIndex(selectedInterface);
            DMX.setReadyLive();
            System.out.println("Selecting interface number " + selectedInterface);
        }
        catch (DMXException x) {
            JOptionPane.showMessageDialog(this,
                "DMX Error\n" + x.getMessage(),
                "DMX Error",
                JOptionPane.ERROR_MESSAGE);
            selectedInterface = -1;
        }

} else {
        JOptionPane.showMessageDialog(this,
            "Can't load DMX library!",
            "DMX Error",
            JOptionPane.ERROR_MESSAGE);
        selectedInterface = -1;
    }
}
}
```

- 53 -

```java
            maxLabel.setText(String.valueOf(dataMax));
            minLabel.setText(String.valueOf(dataMin));
        }
        playerThread = new DMXPlayerThread(delayInput.getValue(), dataList, dataMin, dataMax, DMX);
        th = new Thread(playerThread);
        th.setPriority(th.MIN_PRIORITY);
        th.start();
    }
    public void initButtonActionPerformed(java.awt.event.ActionEvent e)
    {
        if (DMXUniverse.isAvailable()) {
            interNames = DMXUniverse.getInterfaceNames();
            String reply = (String)JOptionPane.showInputDialog(
                this,
                "Select a DMX interface:",
                "Select",
                JOptionPane.QUESTION_MESSAGE,
                null,
                interNames,
                interNames[0]);

if (reply == null) return;

selectedInterface = -1;
            for (int i = 0; i < interNames.length; i++) {
                if (reply == interNames[i]) {
                    selectedInterface = i;
                    break;
                }
            } try {
                DMX.close();
                DMX.selectInterfaceFromIndex(selectedInterface);
                DMX.setReadyLive();
                System.out.println("Selecting interface number " + selectedInterface);
            }
            catch (DMXException x) {
                JOptionPane.showMessageDialog(this,
                    "DMX Error\n" + x.getMessage(),
                    "DMX Error",
                    JOptionPane.ERROR_MESSAGE);
                selectedInterface = -1;
            }
        } else {
            JOptionPane.showMessageDialog(this,
                "Can't load DMX library!",
                "DMX Error",
                JOptionPane.ERROR_MESSAGE);
            selectedInterface = -1;
        }
    }
}
```

```
/*
 * DMXPlayerThread.java
 *
 * Title:        DMXPlayer
 * Author:       bchemel
 * Description:  This application reads data from a text file and writes it to a DMX channel...
 */ import java.util.*;
import com.colorkinetics.control.dmx.*;
import javax.swing.*;
import java.awt.*;

public class DMXPlayerThread implements Runnable {
    public int delay;
    public Double max;
    public Double min;
    public double oldVal = 0.0;
    public double mean = 0.0;
    public LinkedList data;
    public boolean shouldRun = false;

public DMXUniverse DMX;
    private String[] interNames;
    private int selectedInterface = -1;
    private JFrame frame;

private static final int IRDA_BAUD = 1;
    private static final int SP_BAUD_SJ1 = 10;
    private static final int SP_BAUD_SJ2 = 4;
    private static final int SJ1 = 1;
    private static final int SJ2 = 2;

private int irdaBaud = IRDA_BAUD;
    private int spBaud = SP_BAUD_SJ2;
    private int interfaceValue = SJ2;

public DMXPlayerThread(int d, LinkedList l, Double Min, Double Max, DMXUniverse univ) {
        DMX = univ;
        delay = d;
        data = l;
        max = Max;
        min = Min;
        int len = data.size();

for(int i = 0; i < len; i++) {
            mean += ((Double)data.get(i)).doubleValue() / (double)len;
        }
    } public void run() {
        while(true) {
            while(shouldRun) {
                DMXFrame buffer = new DMXFrame(512);

try{
                    Double D = (Double)data.removeFirst();
                    System.out.println("New value: " + D);
                    data.add(D);
                    float span = (float)max.doubleValue() - (float)min.doubleValue();
//                  float hue = ((float)D.doubleValue() - (float)min.doubleValue())/span;
                    double d = D.doubleValue();

try {
                        for(int i = 0; i < delay; i++) {
                            double outVal = oldVal + (((double)i + 1.0)/(double)delay)*(d - oldVal);
                            float hue = (float)0.0;
                            if(outVal > mean) {
                                hue = (float)(1.0/3.0);
                            } else {
                                hue = (float)0.0;
                            }
                            float brightness = (float)0.00 + (Math.abs((float)(outVal - mean))/span);
```

```
            Color c = new Color(Color.HSBtoRGB(hue, (float)1.0, brightness));

buffer.setData(0, c.getRed(), 0);
            buffer.setData(1, c.getGreen(), 0);
            buffer.setData(2, c.getBlue(), 0);
            DMX.sendFrame(buffer);
            buffer.resetPriority();
//          Thread.sleep(1);
          }
        } catch (Exception x) {
            System.out.println("Caught a DMX error!");
            System.out.println(x);
        } oldVal = d;
      } catch (Exception e) {}
    }
  }
}
```

```
// IntegerInput.java
//
//
//
//
//
//
import javax.swing.*;
import javax.swing.text.*;
import java.awt.*;
import java.awt.event.*;
/**
 * An input field for integers.
 *
 * @version 1.0
 * @author Mike Blackwell
 */
public class IntegerInput extends JTextField { private int minval, maxval;

/**
     * Create a new integer input field with an initial value of <code>initval</code>,
     * and a column width of <code>columns</code>. Minimum and maximum values are
     * specified.
     */
    public IntegerInput(int initval, int columns, int min, int max) {
        super(columns);
        minval = min;
        maxval = max;
        setDocument(new IntegerDocument());
        if (initval < min) {
            setValue(min);
        } else if (initval > max) {
            setValue(max);
        } else {
            setValue(initval);
        }
    }

/**
     * Create a new integer input field with a min of 0 and a max of
     * Integer.MAX_VALUE.
     */
    public IntegerInput(int initval, int columns) {
        this(initval, columns, 0, Integer.MAX_VALUE);
    }

/**
     * Return the integer value contained in the field.
     */
    public int getValue() {
        int val;
        try {
            val = Integer.parseInt(getText());
        }
        catch (NumberFormatException e) {
            val = 0;
        }
        return val;
    }

/**
     * Set the integer value of the field.
     */
    public void setValue(int val) {
        setText(Integer.toString(val));
    }
```

- 57 -

```
public int getMinValue() { return minVal; }
public int getMaxValue() { return maxVal; }
public void setMinValue(int v) { minVal = v; }
public void setMaxValue(int v) { maxVal = v; } class IntegerDocument extends PlainDocument {
    public void insertString(int offset, String s, AttributeSet attrs)
            throws BadLocationException {

// Test build the resulting string first. Beep and don't
        // allow if it's not an integer, or if it's out of bounds.
        StringBuffer t = new StringBuffer(getText(0, getLength()));
        t.insert(offset, s);
        try {
            int v = Integer.parseInt(t.toString());
            if ((v < minVal) || (v > maxVal))
                throw new Exception("Integer out of bounds");
        }
        catch (Exception e) {
            Toolkit.getDefaultToolkit().beep();
            return;
        }
        super.insertString(offset, s, attrs);
    }
}
```

```
/*
    DMXPlayerApp.java

Title:          DMXPlayer
    Author:         bchemel
    Description:    This application reads data from a text file and writes it to a DMX channel...
*/ import DMXPlayerFrame;
import javax.swing.*;

public class DMXPlayerApp
{
    public DMXPlayerApp()
    {
        try {
            // For native Look and Feel, uncomment the following code.
            /*
            try {
                UIManager.setLookAndFeel(UIManager.getSystemLookAndFeelClassName());
            }
            catch (Exception e) {
            }
            */
            DMXPlayerFrame frame = new DMXPlayerFrame();
            frame.initComponents();
            frame.setVisible(true);
        }
        catch (Exception e) {
            e.printStackTrace();
        }
    }

// Main entry point
    static public void main(String[] args)
    {
        new DMXPlayerApp();
    }
}
```

What is claimed is:

1. An automotive lighting system comprising:
   at least one LED-based light source configured to generate at least visible radiation associated with a vehicle; and
   at least one processor configured to control the at least one LED-based light source such that the generated visible radiation has at least one of a variable color over a range of colors including at least three different perceivable colors and a variable intensity over a range of intensities including at least three different perceivable intensities.

2. The system of claim 1, further comprising at least one receiver coupled to the at least one processor and configured to receive at least one control signal, the at least one processor controlling the at least one LED-based light source based at least in part on the at least one control signal, the receiver being configured to receive the at least one control signal via at least one of an electromagnetic, RF, IR, microwave, acoustic, wire, cable, and network transmission.

3. The system of claim 1, further comprising at least one receiver coupled to the at least one processor and configured to receive at least one control signal, the at least one processor controlling the at least one LED-based light source based at least in part on the at least one control signal, the receiver being configured to receive the at least one control signal from at least one of a selector switch, manual indicator, manual switch, rotary dial, dial, slide switch, button, and rocker switch.

4. The system of claim 2 or 3 further comprising:
   memory wherein the memory is associated with the at least one processor;
   wherein the memory is capable of storing lighting control information associated with the at least one control signal and the at least one processor is capable of retrieving the lighting control information for controlling the at least one LED-based light source.

5. The system of claim 1, further comprising an optical fiber positioned with respect to the at least one LED-based light source such that at least some of the generated visible radiation illuminates the fiber.

6. The system of claim 1, wherein:
   the at least one LED-based light source includes at least one first LED adapted to output first radiation having a first spectrum and at least one second LED adapted to output second radiation having a second spectrum different from the first spectrum; and
   the at least one processor is configured to independently control at least a first intensity of the first radiation and a second intensity of the second radiation such that the generated visible radiation has at least one of the variable color and the variable intensity.

7. An automotive information lighting system comprising:
   at least one LED-based light source configured to generate at least visible radiation associated with a vehicle;
   at least one processor configured to control the at least one LED-based light source;
   a display wherein the at least one LED-based light source is positioned so as to cause illumination of the display upon generation of at least the visible radiation; and
   at least one sensor configured to provide information relating to at least one condition associated with the vehicle,
   wherein the at least one processor is configured to monitor the information provided by the at least one sensor and control the at least one LED-based light source such that the generated visible radiation has at least one of a variable color over a range of colors including at least three different perceivable colors and a variable intensity over a range of intensities including at least three different perceivable intensities based at least in part on the monitored information.

8. The system of claim 7, wherein the display comprises at least one of an instrument panel, panel, tachometer, speedometer, clock, pressure gauge, temperature gauge, fuel gauge, and battery charge gauge.

9. The system of claim 7, wherein the display comprises a material wherein the at least one LED-based light source is directed to illuminate the material.

10. A method for providing illumination in connection with a vehicle, comprising acts of:
    A) monitoring information provided by an information system; and
    B) controlling an illumination system including at least one LED-based light source so as to generate at least visible radiation associated with the vehicle, the generated visible radiation having at least one of a variable color over a range of colors including at least three different perceivable colors and a variable intensity over a range of intensities including at least three different perceivable intensities, based at least in part on the monitored information.

11. The method of claim 10, wherein the act A) includes an act of:
    monitoring information relating to at least one condition associated with the vehicle.

12. The method of claim 10, wherein the information system comprises a network, and wherein the act A) includes an act of:
    monitoring the information from the network.

13. The method of claim 10, wherein the act B) includes an act of:
    using a pulse-width-modulation process to control the illumination system.

14. The method of claim 10, wherein the information system comprises at least one sensor for sensing at least one condition, and wherein the act A) includes an act of:
    monitoring information relating at least in part to the at least one condition.

15. The method of claim 14, wherein the at least one condition includes an external condition to the vehicle.

16. The method of claim 14, wherein the at least one condition includes an internal condition of the vehicle.

17. The method of claim 14, wherein the at least one condition includes a maintenance condition of the vehicle.

18. The method of claim 14, wherein the at least one condition includes a condition associated with a mechanical or electrical system of the vehicle.

19. The method of claim 18, wherein the mechanical or electrical system is selected from the group consisting of a motor, an engine, an electrical system, a heating system, a cooling system, an air conditioning system, a climate control system, a transmission system, a lubrication system, a combustion system, a spark plug system, a valve system, a rotor system, a restraint system, an air bag system, a storage system, a light system, a signal system, a braking system, an acceleration system, a drive system, a display system, a dashboard system, a tachometer system, a speedometer system, a heads-up display system, and a steering system.

20. The method of claim 19, wherein the act A) includes an act of:

monitoring the information relating to the at least one condition via a port on the vehicle so as to receive the information relating to at least one of the selected mechanical or electrical systems of the vehicle.

21. The method of claim 19, wherein the act B) includes an act of:
controlling the illumination system such that at least the generated visible radiation provides a diagnosis of the at least one condition associated with the mechanical or electrical system.

22. The method of claim 10, wherein the illumination system is disposed on an instrument panel of the vehicle.

23. The method of claim 22, wherein the instrument panel comprises a tachometer.

24. The method of claim 10, wherein the illumination system is implemented in a heads-up display of the vehicle.

25. The method of claim 10, wherein the illumination system comprises a display.

26. The method of claim 25, further comprising an act of:
C) displaying information via at least the generated visible radiation, the displayed information being selected from the group consisting of inside temperature, outside temperature, oil temperature, engine temperature, engine speed, rotations per minute, oil pressure, coolant pressure, brake line pressure, vehicle speed, air quality, system settings, a pending event, a pending collision, traffic density, fuel mileage, remaining fuel, battery status, and battery charge remaining.

27. The method of claim 10, wherein the information system comprises a communications facility and wherein the act B) includes an act of:
controlling the illumination system to generate at least the visible radiation so as to indicate a communication event.

28. The method of claim 27, wherein the communication event is selected from the group consisting of an email, a phone call, a cellphone call, a message from a specific individual, and an instant message.

29. The method of claim 10, wherein the illumination system comprises an optical fiber disposed in the vehicle so as to illuminate a cup holder with the generated visible radiation.

30. The method of claim 10, wherein the act B) includes an act of:
executing at least one lighting program in response to the monitored information so as to provide at least one lighting effect based on the generated visible radiation, the at least one lighting effect selected from the group consisting of a color chasing rainbow, a strobe, a flashing light, a color wash, a color fade, a white light of a selected color temperature, a different color for different areas of the interior of the vehicle, a pattern, a logo, a design, a trademark, a service mark, and a design mark.

31. The method of claim 10, wherein the information system includes a vehicle security system, and wherein the act B) includes an act of:
controlling the illumination system so as to indicate a status of the vehicle security system.

32. The method of claim 10, wherein the information system is configured to provide information relating to user-preferred characteristics of the generated visible radiation, and wherein the act B) includes an act of:
controlling the illumination system based at least in part on the user-preferred characteristics.

33. The method of claim 10, wherein the illumination system is implemented as a brake light system for the vehicle.

34. The method of claim 33, wherein the information system comprises a sensor for sensing a pressure on at least one brake or a brake pedal of the vehicle, and wherein:
the act A) includes an act of monitoring information relating to the pressure; and
the act B) includes an act of controlling the illumination system based at least in part on the monitored information relating to the pressure.

35. The method of claim 34, wherein the act B) includes an act of:
controlling the illumination system so as to generate at least the visible radiation having at least a variable intensity based on a corresponding pressure of a foot of a driver on the brake pedal.

36. The method of claim 34, wherein the act B) includes an act of:
controlling the illumination system to generate at least the visible radiation so as to form a warning pattern based at least in part on the monitored information relating to the pressure.

37. The method of claim 33, wherein the information system comprises a sensor for sensing a breaking rate of the vehicle, and wherein:
the act A) includes an act of monitoring information relating to the breaking rate; and the act B) includes an act of controlling the illumination system based at least in part on the monitored information relating to the breaking rate.

38. The method of claim 10, wherein the illumination system is implemented as a vehicle component selected from the group consisting of brake lights, head lights, hazard lights, fog lights, beacon lights, indicator lights, turn signals, and tail lights.

39. The method of claim 10, wherein the act B) includes an act of:
controlling the illumination system such that the generated visible radiation has a variable color over a range of colors including at least three different perceivable colors, based at least in part on the monitored information.

40. The method of claim 39, wherein the information system provides information relating to at least one weather condition and wherein:
the act A) includes an act of monitoring the information relating to the at least one weather condition; and
the act B) includes an act of controlling the illumination system based at least in part on the at least one weather condition.

41. The method of claim 40, wherein the at least one weather condition is fog and wherein the act B) includes an act of:
controlling the illumination system such that a color of the generated visible radiation is orange.

42. The method of claim 10, wherein the illumination system is disposed under a hood of the vehicle.

43. The method of claim 10, wherein the vehicle includes a panel and wherein the method further includes an act of:
backlighting the panel via the generated visible radiation.

44. The method of claim 43, wherein the act B) includes an act of:
controlling the illumination system so as to illuminate the panel in a particular color to indicate an item of information.

45. The method of claim 44, wherein the item of information includes an incoming communication.

46. A method of illuminating an instrument panel of a vehicle with informational lighting comprising acts of:
  A) illuminating the instrument panel with visible radiation generated by at least one LED-based light source; and
  B) controlling the at least one LED-based light source such that the visible radiation has at least one of a variable color over a range of colors including at least three different perceivable colors and a variable intensity over a range of intensities including at least three different perceivable intensities, based at least in part on monitored information associated with the vehicle.

47. The method of claim 46 wherein the act A) includes an act of:
  illuminating the instrument panel by at least one of edge lighting, back lighting, and surface lighting.

48. The method of claim 46 wherein the instrument panel includes at least one of a tachometer, a speedometer, a clock, a pressure gauge, a temperature gauge, a fuel gauge, and a battery charge gauge.

49. The method of claim 46, wherein the act B) includes an act of:
  executing at least one lighting control program in response to the monitored information so as to control the at least one LED-based light source.

50. A vehicle lighting method, comprising acts of:
  A) generating at least visible radiation associated with a vehicle using at least one LED-based light source; and
  B) controlling the at least one LED-based light source such that the generated visible radiation has at least one of a variable color over a range of colors including at least three different perceivable colors and a variable intensity over a range of intensities including at least three different perceivable intensities.

51. The method of claim 50, further comprising an act of:
  receiving at least one control signal for the at least one LED-based light source via at least one of an electromagnetic, RF, IR, microwave, acoustic, wire, cable, and network transmission.

52. The method of claim 50, further comprising an act of:
  receiving at least one control signal for the at least one LED-based light source from at least one of a selector switch, manual indicator, manual switch, rotary dial, dial, slide switch, button, and rocker switch.

53. The method of claim 51, or 52, wherein the act B) comprises an act of:
  executing at least one lighting control program in response to the at least one control signal so as to control the at least one LED-based light source.

54. The method of claim 50 wherein the act A) includes an act of:
  illuminating a fiber with the generated visible radiation.

55. The method of claim 50 wherein the at least one LED-based light source includes at least one first LED adapted to output first radiation having a first spectrum and at least one second LED adapted to output second radiation having a second spectrum different from the first spectrum, and wherein the act B) includes an act of:
  independently controlling at least a first intensity of the first radiation and a second intensity of the second radiation such that the generated visible radiation has at least one of the variable color and the variable intensity.

56. A vehicle lighting method comprising acts of:
  A) illuminating at least a portion of the vehicle with visible radiation generated by at least one LED-based light source; and
  B) controlling the at least one LED-based light source such that the visible radiation has at least one of a variable color over a range of colors including at least three different perceivable colors and a variable intensity over a range of intensities including at least three different perceivable intensities, based at least in part on monitored information associated with the vehicle.

57. The method of claim 56 wherein the illuminated portion of the vehicle comprises at least one of a passenger compartment, an instrument panel, a panel, a tachometer, a speedometer, a clock, a pressure gauge, a temperature gauge, a fuel gauge, and a battery charge gauge.

58. A system for a vehicle, comprising:
  an illumination system including at least one LED-based light source configured to generate at least visible radiation associated with the vehicle; and
  at least one controller configured to monitor information provided by an information system and control the at least one LED-based light source such that the generated visible radiation has at least one of a variable color over a range of colors including at least three different perceivable colors and a variable intensity over a range of intensities including at least three different perceivable intensities based at least in part on the monitored information.

59. The system of claim 58, wherein the information system is configured to provide information relating to at least one condition associated with the vehicle.

60. The system of claim 59, wherein the information system comprises a network.

61. The system of claim 58, wherein the at least one controller is configured to implement a pulse-width-modulation process to control the illumination system.

62. The system of claim 58, in combination with the information system, wherein the information system comprises at least one sensor for sensing at least one condition, and wherein the information provided by the information system relates at least in part to the at least one condition.

63. The combination of claim 62, wherein the at least one condition includes an external condition to the vehicle.

64. The combination of claim 62, wherein the at least one condition includes an internal condition of the vehicle.

65. The combination of claim 62, wherein the at least one condition includes a maintenance condition of the vehicle.

66. The combination of claim 62, wherein the at least one condition includes a condition associated with a mechanical or electrical system of the vehicle.

67. The combination of claim 66, wherein the mechanical or electrical system is selected from the group consisting of a motor, an engine, an electrical system, a heating system, a cooling system, an air conditioning system, a climate control system, a transmission system, a lubrication system, a combustion system, a spark plug system, a valve system, a rotor system, a restraint system, an air bag system, a storage system, a light system, a signal system, a braking system, an acceleration system, a drive system, a display system, a dashboard system, a tachometer system, a speedometer system, a heads-up display system, and a steering system.

68. The combination of claim 67, wherein the at least one controller is configured to be connected to a port on the vehicle to receive the information relating to at least one of the selected mechanical or electrical systems of the vehicle.

69. The combination of claim 67, wherein the at least one controller is configured to control the illumination system such that at least the generated visible radiation provides a diagnosis of the at least one condition associated with the mechanical or electrical system.

70. The system of claim 58, wherein the illumination system is disposed on an instrument panel of the vehicle.

71. The system of claim 70, wherein the instrument panel comprises a tachometer.

72. The system of claim 58, wherein the illumination system is implemented in a heads-up display of the vehicle.

73. The system of claim 58, wherein the illumination system comprises a display.

74. The system of claim 73, wherein the monitored information represents information selected from the group consisting of inside temperature, outside temperature, oil temperature, engine temperature, engine speed, rotations per minute, oil pressure, coolant pressure, brake line pressure, vehicle speed, air quality, system settings, a pending event, a pending collision, traffic density, fuel mileage, remaining fuel, battery status, and battery charge remaining.

75. The system of claim 58, wherein the information system comprises a communications facility and wherein the at least one controller is configured to control the illumination system to generate at least the visible radiation so as to indicate a communication event.

76. The system of claim 75, wherein the communication event is selected from the group consisting of an email, a phone call, a cellphone call, a message from a specific individual, and an instant message.

77. The system of claim 58, wherein the illumination system comprises an optical fiber disposed in the vehicle so as to illuminate a cup holder.

78. The system of claim 58, wherein the at least one controller is configured to execute at least one lighting program in response to the monitored information so as to provide at least one lighting effect based on the generated visible radiation, the at least one lighting effect selected from the group consisting of a color chasing rainbow, a strobe, a flashing light, a color wash, a color fade, a white light of a selected color temperature, a different color for different areas of the interior of the vehicle, a pattern, a logo, a design, a trademark, a service mark, and a design mark.

79. The system of claim 58, wherein the at least one controller is configured to control the illumination system so as to indicate a status of a security system associated with the vehicle.

80. The system of claim 58, wherein the information system is configured to provide information relating to user-preferred characteristics of the generated visible radiation, and wherein the at least one controller is configured to control the illumination system based at least in part on the user-preferred characteristics.

81. The system of claim 58, wherein the illumination system is implemented as a vehicle component selected from the group consisting of brake lights, headlights, hazard lights, fog lights, beacon lights, indicator lights, turn signals, and taillights.

82. The system of claim 58, wherein the at least one controller is configured to control the illumination system such that the generated visible radiation has a variable color over a range of colors including at least three different perceivable colors.

83. The system of claim 82, wherein the information system is configured to provide information relating to at least one weather condition, and wherein the variable color of the generated visible radiation relates to the at least one weather condition.

84. The system of claim 83, wherein the at least one weather condition is fog and a color of the generated visible radiation is orange.

85. The system of claim 58, wherein the illumination system is disposed under a hood of the vehicle.

86. The system of claim 58, wherein the vehicle includes a panel and wherein the illumination system is disposed in the panel so as to provide backlighting for the panel.

87. The system of claim 86, wherein the at least one controller is configured to control the illumination system so as to illuminate the panel in a particular color to indicate an item of information.

88. The system of claim 87, wherein the item of information includes an incoming communication.

* * * * *

UNITED STATES PATENT AND TRADEMARK OFFICE
CERTIFICATE OF CORRECTION

PATENT NO. : 6,717,376 B2  Page 1 of 1
APPLICATION NO. : 09/989095
DATED : April 6, 2004
INVENTOR(S) : Ihor A. Lys et al.

It is certified that error appears in the above-identified patent and that said Letters Patent is hereby corrected as shown below:

On the title page, after "Related U.S. Application Data," please replace section (63) with the following:

Continuation-in-part of application No. 09/669,121, filed on Sep. 25, 2000, which is a continuation of application No. 09/425,770, filed on Oct. 22, 1999, now Pat. No. 6,150,774, which is a continuation of application No. 08/920,156, filed on Aug. 26, 1997, now Pat. No. 6,016,038~~, application No. 09/989,095, which is a c~~_,_ Continuation-in-part of application No. 09/333,739, filed on Jun. 15, 1999, and a continuation-in-part of application No. 09/215,624, filed on Dec. 17, 1998, and a continuation-in-part of application No. 09/213,607, filed on Dec. 17, 1998, and a continuation-in-part of application No. 09/213,189, filed on Dec. 17, 1998, and a continuation-in-part of application No. 09/213,581, filed on Dec. 17, 1998, and a continuation-in-part of application No. 09/213,540, filed on Dec. 17, 1998,~~ application no. 09/989,095, which is a~~ and a continuation-in-part of application No. 09/742,017, filed on Dec. 20, 2000, which is a continuation of application No. 09/213,548, filed on Dec. 17, 1998, now Pat. No. 6,166,496_._ ~~application No. 09/989,095, which is a c~~ Continuation-in-part of application No. 09/815,418 filed on Mar. 22, 2001, which is a continuation of application No. 09/213,548, filed on Dec. 17, 1998, now Pat. No. 6,166,496_.,_ ~~application No. 09/989,095, which is a c~~ Continuation-in-part of application No. 09/626,905, filed on Jul. 27, 2000, now Pat. No. 6,340,868, which is a continuation of application No. 09/213,659, filed on Dec. 17, 1998, now Pat. No. 6,211,626.

Signed and Sealed this

Twelfth Day of June, 2007

JON W. DUDAS
*Director of the United States Patent and Trademark Office*